United States Patent
Genslak et al.

(10) Patent No.: US 9,587,573 B2
(45) Date of Patent: Mar. 7, 2017

(54) CATALYST LIGHT OFF TRANSITIONS IN A GASOLINE ENGINE USING MODEL PREDICTIVE CONTROL

(71) Applicant: GM Global Technology Operations LLC, Detroit, MI (US)

(72) Inventors: Robert J. Genslak, Macomb, MI (US); Gary Robert Cygan, Jr., Auburn Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1 day.

(21) Appl. No.: 14/225,891

(22) Filed: Mar. 26, 2014

(65) Prior Publication Data

US 2015/0275792 A1 Oct. 1, 2015

(51) Int. Cl.
*F01N 3/20* (2006.01)
*F02D 41/02* (2006.01)
*F02D 41/14* (2006.01)

(52) U.S. Cl.
CPC ....... *F02D 41/024* (2013.01); *F02D 41/0255* (2013.01); *F02D 41/1444* (2013.01); *F02D 41/1445* (2013.01); *F02D 41/1446* (2013.01); *F02D 41/1441* (2013.01); *F02D 41/1454* (2013.01); *F02D 2041/1433* (2013.01);
(Continued)

(58) Field of Classification Search
CPC ........... B60W 20/108; B60W 20/1082; B60W 2510/068; B60W 2510/0676; B60W 2710/0666; Y02T 10/6291; F02D 41/024–41/0255; F02D 41/068; F02D 41/1402; F02D 2041/1433; F02D 2041/1437; F02D 2200/0802; F02D 2200/0804
See application file for complete search history.

(56) References Cited

U.S. PATENT DOCUMENTS

| | | |
|---|---|---|
| 4,161,929 A | 7/1979 | Nohira et al. |
| 4,823,266 A | 4/1989 | Baltusis et al. |

(Continued)

FOREIGN PATENT DOCUMENTS

| | | |
|---|---|---|
| CN | 1594846 A | 3/2005 |
| WO | WO-03-065135 A1 | 8/2003 |

OTHER PUBLICATIONS

U.S. Appl. No. 13/613,588, filed Sep. 13, 2012, Livshiz et al.
(Continued)

*Primary Examiner* — Jonathan Matthias

(57) ABSTRACT

A system includes a catalyst light-off module that selectively generates a first signal based on an engine coolant temperature and an estimated exhaust enthalpy, a setpoint module that selectively initiates a catalyst light-off period in response to receiving the first signal and that generates a desired exhaust enthalpy, and a first model predictive control (MPC) module that generates predicted parameters based on a model of an engine and a set of possible target values, generates a cost for the set of possible target values based on the predicted parameters and the desired exhaust enthalpy, and selects the set of possible target values from multiple sets of possible target values based on the cost. The system also includes an engine actuator module that adjusts an actuator of the engine based on at least one of the target values.

14 Claims, 5 Drawing Sheets

(52) U.S. Cl.
CPC .............. F02D 2200/021 (2013.01); F02D 2200/0802 (2013.01); Y02T 10/26 (2013.01)

(56) References Cited

U.S. PATENT DOCUMENTS

| | | | |
|---|---|---|---|
| 5,070,846 A | 12/1991 | Dudek et al. | |
| 5,101,786 A | 4/1992 | Kamio et al. | |
| 5,268,835 A | 12/1993 | Miyagaki et al. | |
| 5,270,935 A | 12/1993 | Dudek et al. | |
| 5,293,553 A | 3/1994 | Dudek et al. | |
| 5,347,446 A | 9/1994 | Iino et al. | |
| 5,357,932 A | 10/1994 | Clinton et al. | |
| 5,609,136 A | 3/1997 | Tuken | |
| 5,706,780 A | 1/1998 | Shirakawa | |
| 5,727,528 A | 3/1998 | Hori et al. | |
| 5,775,293 A | 7/1998 | Kresse | |
| 5,794,171 A | 8/1998 | Bryant et al. | |
| 5,921,219 A | 7/1999 | Frohlich et al. | |
| 6,014,955 A | 1/2000 | Hosotani et al. | |
| 6,155,230 A | 12/2000 | Iwano et al. | |
| 6,532,935 B2 | 3/2003 | Ganser et al. | |
| 6,571,191 B1 | 5/2003 | York et al. | |
| 6,606,981 B2 | 8/2003 | Itoyama | |
| 6,619,261 B1 | 9/2003 | Wang et al. | |
| 6,704,638 B2 | 3/2004 | Livshiz et al. | |
| 6,714,852 B1 | 3/2004 | Lorenz et al. | |
| 6,826,904 B2 | 12/2004 | Miura | |
| 6,840,215 B1 | 1/2005 | Livshiz et al. | |
| 6,928,362 B2 | 8/2005 | Meaney | |
| 6,985,809 B2 | 1/2006 | Yasui | |
| 7,016,779 B2 | 3/2006 | Bowyer | |
| 7,021,282 B1 | 4/2006 | Livshiz et al. | |
| 7,051,058 B2 | 5/2006 | Wagner et al. | |
| 7,076,953 B2 | 7/2006 | Kreso | |
| H002182 H | 2/2007 | Freel et al. | |
| 7,225,782 B2 | 6/2007 | Pallett et al. | |
| 7,274,986 B1 | 9/2007 | Petridis et al. | |
| 7,275,374 B2 | 10/2007 | Stewart et al. | |
| 7,328,577 B2 | 2/2008 | Stewart et al. | |
| 7,395,147 B2 | 7/2008 | Livshiz et al. | |
| 7,400,967 B2 | 7/2008 | Ueno et al. | |
| 7,433,775 B2 | 10/2008 | Livshiz et al. | |
| 7,441,544 B2 | 10/2008 | Hagari | |
| 7,472,692 B2 | 1/2009 | Nakagawa et al. | |
| 7,614,384 B2 | 11/2009 | Livshiz et al. | |
| 7,650,225 B2 | 1/2010 | Nakagawa et al. | |
| 7,703,439 B2 | 4/2010 | Russell et al. | |
| 7,715,975 B2 | 5/2010 | Yamaoka et al. | |
| 7,775,195 B2 | 8/2010 | Schondorf et al. | |
| 7,783,409 B2 | 8/2010 | Kang et al. | |
| 7,813,869 B2 | 10/2010 | Grichnik et al. | |
| 7,885,756 B2 | 2/2011 | Livshiz et al. | |
| 7,941,260 B2 | 5/2011 | Lee et al. | |
| 7,967,720 B2 | 6/2011 | Martin et al. | |
| 8,032,235 B2 | 10/2011 | Sayyar-Rodsari | |
| 8,041,487 B2 | 10/2011 | Worthing et al. | |
| 8,050,841 B2 | 11/2011 | Costin et al. | |
| 8,073,610 B2 | 12/2011 | Heap et al. | |
| 8,103,425 B2 | 1/2012 | Choi et al. | |
| 8,103,428 B2 | 1/2012 | Russ et al. | |
| 8,116,954 B2 | 2/2012 | Livshiz et al. | |
| 8,176,735 B2 | 5/2012 | Komatsu | |
| 8,255,139 B2 | 8/2012 | Whitney et al. | |
| 8,265,854 B2 | 9/2012 | Stewart et al. | |
| 8,307,814 B2 | 11/2012 | Leroy et al. | |
| 8,360,040 B2 | 1/2013 | Stewart et al. | |
| 8,447,492 B2 | 5/2013 | Watanabe et al. | |
| 8,468,821 B2 | 6/2013 | Liu et al. | |
| 8,483,935 B2 | 7/2013 | Whitney et al. | |
| RE44,452 E | 8/2013 | Stewart et al. | |
| 8,560,204 B2 | 10/2013 | Simon, Jr. et al. | |
| 8,739,766 B2 | 6/2014 | Jentz et al. | |
| 8,760,003 B2 | 6/2014 | Imura et al. | |
| 8,862,248 B2 | 10/2014 | Yasui | |
| 8,954,257 B2 | 2/2015 | Livshiz et al. | |
| 9,052,997 B2 | 6/2015 | Ono | |
| 9,062,631 B2 | 6/2015 | Kinugawa et al. | |
| 9,075,406 B2 | 7/2015 | Nakada | |
| 9,127,614 B2 | 9/2015 | Ueno et al. | |
| 9,145,841 B2 | 9/2015 | Miyazaki et al. | |
| 9,175,628 B2 | 11/2015 | Livshiz et al. | |
| 9,243,524 B2 | 1/2016 | Whitney et al. | |
| 9,328,671 B2 | 5/2016 | Whitney et al. | |
| 9,334,815 B2 | 5/2016 | Cygan, Jr. et al. | |
| 9,399,959 B2 | 7/2016 | Whitney et al. | |
| 2002/0038647 A1 | 4/2002 | Tashiro et al. | |
| 2002/0078924 A1 | 6/2002 | Yagi | |
| 2002/0128116 A1 | 9/2002 | Idogawa et al. | |
| 2002/0179050 A1 | 12/2002 | Soliman et al. | |
| 2003/0074892 A1* | 4/2003 | Miura | F02D 41/0055 60/284 |
| 2003/0110760 A1 | 6/2003 | Shirakawa | |
| 2003/0145836 A1 | 8/2003 | Linna et al. | |
| 2003/0177765 A1 | 9/2003 | Wang | |
| 2004/0116220 A1 | 6/2004 | Yamamoto et al. | |
| 2005/0065691 A1 | 3/2005 | Cho | |
| 2005/0131620 A1 | 6/2005 | Bowyer | |
| 2005/0166900 A1 | 8/2005 | Song et al. | |
| 2005/0171670 A1 | 8/2005 | Yoshioka et al. | |
| 2005/0193739 A1 | 9/2005 | Brunell et al. | |
| 2005/0204726 A1 | 9/2005 | Lewis | |
| 2005/0228573 A1 | 10/2005 | Gangopadhyay | |
| 2005/0267608 A1 | 12/2005 | Nishira et al. | |
| 2006/0113799 A1 | 6/2006 | Obayashi et al. | |
| 2006/0137335 A1 | 6/2006 | Stewart et al. | |
| 2006/0199699 A1 | 9/2006 | Berglund et al. | |
| 2007/0068159 A1 | 3/2007 | Ueno et al. | |
| 2007/0174003 A1 | 7/2007 | Ueno et al. | |
| 2008/0120009 A1 | 5/2008 | Livshiz et al. | |
| 2008/0127938 A1 | 6/2008 | Hagari | |
| 2008/0271718 A1 | 11/2008 | Schondorf et al. | |
| 2008/0308066 A1 | 12/2008 | Martin et al. | |
| 2009/0018733 A1 | 1/2009 | Livshiz et al. | |
| 2009/0033264 A1 | 2/2009 | Falkenstein | |
| 2009/0037066 A1 | 2/2009 | Kuwahara et al. | |
| 2009/0037073 A1 | 2/2009 | Jung et al. | |
| 2009/0118968 A1 | 5/2009 | Livshiz et al. | |
| 2009/0118969 A1* | 5/2009 | Heap | B60K 6/445 701/102 |
| 2009/0118972 A1 | 5/2009 | Baur et al. | |
| 2009/0143959 A1 | 6/2009 | Yamaoka et al. | |
| 2009/0229562 A1 | 9/2009 | Ramappan et al. | |
| 2009/0292435 A1 | 11/2009 | Costin et al. | |
| 2010/0049419 A1 | 2/2010 | Yoshikawa et al. | |
| 2010/0057283 A1 | 3/2010 | Worthing et al. | |
| 2010/0057329 A1 | 3/2010 | Livshiz et al. | |
| 2010/0075803 A1 | 3/2010 | Sharples et al. | |
| 2010/0116249 A1 | 5/2010 | Guerrassi et al. | |
| 2010/0116250 A1 | 5/2010 | Simon, Jr. et al. | |
| 2010/0180876 A1 | 7/2010 | Leroy et al. | |
| 2010/0211294 A1 | 8/2010 | Soejima | |
| 2010/0222982 A1 | 9/2010 | Wang et al. | |
| 2010/0241335 A1 | 9/2010 | Aso | |
| 2010/0263627 A1 | 10/2010 | Whitney et al. | |
| 2010/0268436 A1 | 10/2010 | Soejima et al. | |
| 2010/0280738 A1 | 11/2010 | Whitney et al. | |
| 2011/0034298 A1 | 2/2011 | Doering et al. | |
| 2011/0045948 A1 | 2/2011 | Doering et al. | |
| 2011/0066308 A1 | 3/2011 | Yang et al. | |
| 2011/0082629 A1 | 4/2011 | Soejima et al. | |
| 2011/0087421 A1 | 4/2011 | Soejima et al. | |
| 2011/0100013 A1 | 5/2011 | Whitney et al. | |
| 2011/0113773 A1 | 5/2011 | Liu et al. | |
| 2011/0125390 A1 | 5/2011 | Bellinger et al. | |
| 2011/0144838 A1 | 6/2011 | Matthews et al. | |
| 2011/0264353 A1 | 10/2011 | Atkinson et al. | |
| 2012/0065864 A1 | 3/2012 | Whitney et al. | |
| 2012/0150399 A1 | 6/2012 | Kar et al. | |
| 2012/0203434 A1* | 8/2012 | Sujan | B60W 50/14 701/64 |
| 2012/0209493 A1 | 8/2012 | Miyata et al. | |
| 2012/0296557 A1 | 11/2012 | Ramappan et al. | |
| 2013/0032123 A1 | 2/2013 | Kinugawa et al. | |
| 2013/0032127 A1 | 2/2013 | Jentz et al. | |

(56) References Cited

U.S. PATENT DOCUMENTS

| | | |
|---|---|---|
| 2013/0060448 A1 | 3/2013 | Nakada |
| 2013/0080023 A1 | 3/2013 | Livshiz et al. |
| 2013/0104859 A1 | 5/2013 | Miyazaki et al. |
| 2013/0151124 A1 | 6/2013 | Seiberlich et al. |
| 2013/0184961 A1 | 7/2013 | Kumar et al. |
| 2013/0213353 A1 | 8/2013 | Rollinger et al. |
| 2013/0255625 A1 | 10/2013 | Kar et al. |
| 2014/0076279 A1 | 3/2014 | Livshiz et al. |
| 2014/0123938 A1 | 5/2014 | Whitney et al. |
| 2014/0174413 A1 | 6/2014 | Huang et al. |
| 2014/0174414 A1 | 6/2014 | Huang et al. |
| 2014/0311446 A1 | 10/2014 | Whitney et al. |
| 2014/0316681 A1 | 10/2014 | Whitney et al. |
| 2014/0316682 A1 | 10/2014 | Whitney et al. |
| 2014/0316683 A1 | 10/2014 | Whitney et al. |
| 2015/0039206 A1 | 2/2015 | Storch et al. |
| 2015/0275569 A1 | 10/2015 | LeBlanc |
| 2015/0275711 A1 | 10/2015 | Whitney et al. |
| 2015/0275771 A1 | 10/2015 | Pochner et al. |
| 2015/0275772 A1 | 10/2015 | Long et al. |
| 2015/0275783 A1 | 10/2015 | Wong et al. |
| 2015/0275784 A1 | 10/2015 | Whitney et al. |
| 2015/0275785 A1 | 10/2015 | Cygan, Jr. et al. |
| 2015/0275786 A1 | 10/2015 | Jin et al. |
| 2015/0275789 A1 | 10/2015 | Cygan, Jr. et al. |
| 2015/0275792 A1 | 10/2015 | Genslak et al. |
| 2015/0275794 A1 | 10/2015 | Verdejo et al. |
| 2015/0275795 A1 | 10/2015 | Cygan, Jr. et al. |
| 2015/0275796 A1 | 10/2015 | Pochner et al. |
| 2015/0275806 A1 | 10/2015 | Genslak et al. |
| 2015/0361915 A1 | 12/2015 | Sujan et al. |
| 2015/0369146 A1 | 12/2015 | Zavala Jurado et al. |
| 2016/0237932 A1 | 8/2016 | Long et al. |

OTHER PUBLICATIONS

U.S. Appl. No. 13/613,683, filed Sep. 13, 2012, Livshiz et al.
U.S. Appl. No. 13/686,069, filed Nov. 27, 2012, Livshiz et al.
U.S. Appl. No. 13/911,121, filed Jun. 6, 2013, Whitney et al.
U.S. Appl. No. 13/911,132, filed Jun. 6, 2013, Whitney et al.
U.S. Appl. No. 13/911,148, filed Jun. 6, 2013, Whitney et al,.
U.S. Appl. No. 13/911,156, filed Jun. 6, 2013, Whitney et al.
U.S. Appl. No. 14/032,508, filed Sep. 20, 2013, Storch et al.
U.S. Appl. No. 14/225,492, filed Mar. 26, 2014, Wong et al.
U.S. Appl. No. 14/225,496, filed Mar. 26, 2014, Pochner et al.
U.S. Appl. No. 14/225,502, filed Mar. 26, 2014, Long et al.
U.S. Appl. No. 14/225,507, filed Mar. 26, 2014, Jin et al.
U.S. Appl. No. 14/225,516, filed Mar. 26, 2014, Whitney et al.
U.S. Appl. No. 14/225,531, filed Mar. 26, 2014, Genslak et al.
U.S. Appl. No. 14/225,569, filed Mar. 26, 2014, Long et al.
U.S. Appl. No. 14/225,587, filed Mar. 26, 2014, Cygan, Jr. et al.
U.S. Appl. No. 14/225,626, filed Mar. 26, 2014, Verdejo et al.
U.S. Appl. No. 14/225,808, filed Mar. 26, 2014, Whitney et al.
U.S. Appl. No. 14/225,817, filed Mar. 26, 2014, Cygan, Jr. et al.
U.S. Appl. No. 14/225,896, filed Mar. 26, 2014, Cygan, Jr. et al.
U.S. Appl. No. 14/226,006, filed Mar. 26, 2014, Pochner et al.
U.S. Appl. No. 14/226,121, filed Mar. 26, 2014, Wong et al.
Kolmanovsky, I., "Towards Engine and Powertrain Control Based on Model Predictive Control," (Sep. 28, 2012), Powerpoint Presentation, 47 slides.
U.S. Appl. No. 14/309,047, filed Jun. 19, 2014, Jose C. Zavala Jurado et al.
John C. G. Boot; "Quadratic Programming: Algorithms, Anomalies, Applications vol. 2 of Studies in mathematical and managerial economics"; North-Holland Publ.Comp., 1964; 213 pages.
N. Lawrence Ricker; "Use of quadratic programming for constrained internal model control"; Ind. Eng. Chem. Process Des. Dev., 1985, pp. 925-936.
C. E. Lemke; "A Method of Solution for Quadratic Programs"; Rensselaer Polytechnic Institute, Troy, New York, Published Online: Jul. 1, 1962, pp. 442-453.
U.S. Appl. No. 14/675,828, filed Apr. 1, 2015, Long et al.
U.S. Appl. No. 14/675,860, filed Apr. 2001, Long et al.
U.S. Appl. No. 14/617,068, filed Feb. 9, 2015, Whitney et al.
U.S. Appl. No. 14/931,134, filed Nov. 3, 2015, Wong et al.
U.S. Appl. No. 15/181,559, filed Jun. 14, 2016, Shifang Li et al.
Y. Tian; Department of Aerospace Engineering, the University of Michigan, Ann Arbor, United States; S. Li; Y.-Y. Wang; I. V. Kolmanovsky; "Risk prediction and its use for control of constrained systems with disturbances"; Published in 2015; American Control Conference (ACC); Chicago, IL USA; Jul. 1-3, 2015; pp. 2987-2992.

* cited by examiner

CATALYST LIGHT OFF TRANSITIONS IN A GASOLINE ENGINE USING MODEL PREDICTIVE CONTROL

CROSS-REFERENCE TO RELATED APPLICATIONS

This application is related to U.S. patent application Ser. No. 14/225,502 filed on Mar. 26, 2014, Ser. No. 14/225,516 filed on Mar. 26, 2014, Ser. No. 14/225,569 filed on Mar. 26, 2014, Ser. No. 14/225,626 filed on Mar. 26, 2014, Ser. No. 14/225,817 filed on Mar. 26, 2014, Ser. No. 14/225,896 filed on Mar. 26, 2014, Ser. No. 14/225,531 filed on Mar. 26, 2014, Ser. No. 14/225,507 filed on Mar. 26, 2014, Ser. No. 14/225,808 filed on Mar. 26, 2014, Ser. No. 14/225,587 filed on Mar. 26, 2014, Ser. No. 14/225,492 filed on Mar. 26, 2014, Ser. No. 14/226,006 filed on Mar. 26, 2014, Ser. No. 14/226,121 filed on Mar. 26, 2014, Ser. No. 14/225,496 filed on Mar. 26, 2014. The entire disclosure of the above applications are incorporated herein by reference.

FIELD

The present disclosure relates to internal combustion engines, and more particularly, to systems and methods for increasing the temperature of a catalyst when an engine is started using model predictive control.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

An exhaust system includes a catalyst, such as a three-way catalyst. The catalyst reacts with one or more components of exhaust flowing through the catalyst in order to reduce emissions in the exhaust. The catalyst does not effectively reduce emissions when the catalyst temperature is below a threshold. During a catalyst light-off period, the temperature of the catalyst is increased to a predetermined catalyst temperature.

Engine control systems have been developed to control engine output torque to achieve a desired torque. Traditional engine control systems, however, do not control the engine output torque as accurately as desired. Further, traditional engine control systems do not provide a rapid response to control signals or coordinate engine torque control among various devices that affect the engine output torque.

SUMMARY

A system includes a catalyst light-off module that selectively generates a first signal based on an engine coolant temperature and an estimated exhaust enthalpy, a setpoint module that selectively initiates a catalyst light-off period in response to receiving the first signal and that generates a desired exhaust enthalpy, and a first model predictive control (MPC) module that generates predicted parameters based on a model of an engine and a set of possible target values, generates a cost for the set of possible target values based on the predicted parameters and the desired exhaust enthalpy, and selects the set of possible target values from multiple sets of possible target values based on the cost. The system also includes an engine actuator module that adjusts an actuator of the engine based on at least one of the target values.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
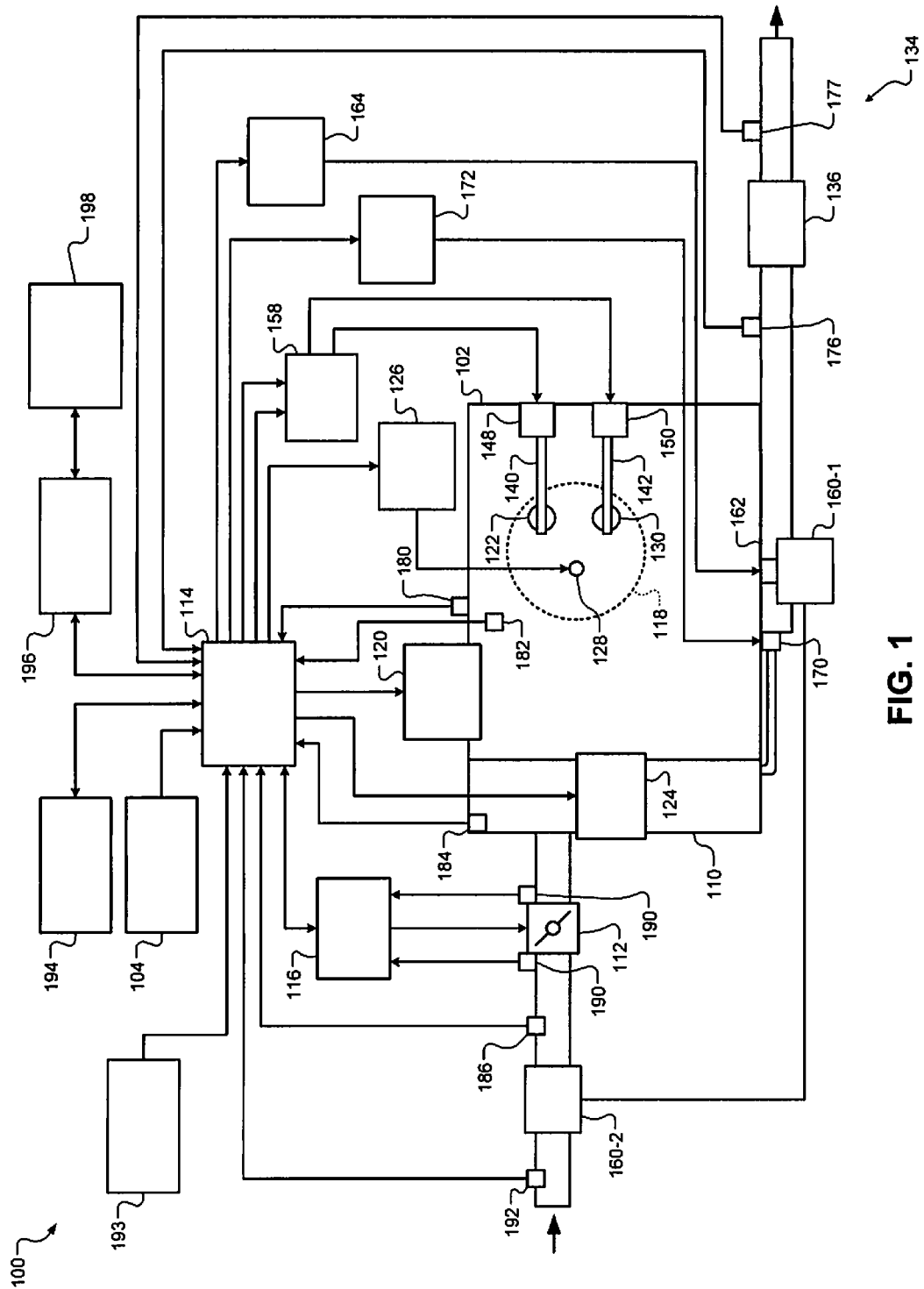
FIG. 1 is a functional block diagram of an example engine system according to the present disclosure.

An engine control module (ECM) controls torque output of an engine. More specifically, the ECM controls actuators of the engine based on target values, respectively, based on a requested amount of torque. For example, the ECM controls intake and exhaust camshaft phasing based on target intake and exhaust phaser angles, a throttle valve based on a target throttle opening, an exhaust gas recirculation (EGR) valve based on a target EGR opening, and a wastegate of a turbocharger based on a target wastegate duty cycle. The ECM also controls spark timing based on target spark timing and controls fueling based on target fueling parameters.

The ECM could determine the target values individually using multiple single input single output (SISO) controllers, such as proportional integral derivative (PID) controllers.

However, when multiple SISO controllers are used, the target values may be set to maintain system stability at the expense of possible fuel consumption decreases and particle emissions decreases. Additionally, calibration and design of the individual SISO controllers may be costly and time consuming.

The ECM of the present disclosure generates the target values using a model predictive control (MPC) module. The MPC module identifies possible sets of target values. The MPC module determines predicted parameters for each of the possible sets based on the possible sets' target values and a mathematical model of the engine. For example, the MPC module may determine a predicted engine torque and one or more other predicted parameters for each of the possible sets of target values.

The MPC module also determines a cost associated with use of each of the possible sets. For example, the cost of a possible set that is predicted to more closely track an engine torque request may be lower than other possible sets that are not expected to track the engine torque request as closely. The MPC module may select the possible set that has a lowest cost and that satisfies various constraints for use to control the actuators.

The ECM attempts to increase the temperature of a catalyst in an exhaust system of the engine as possible while minimizing the emissions output by the engine during a catalyst light-off period. The catalyst light-off period begins when the engine is started while the catalyst temperature is less than a light-off temperature. The catalyst does not effectively reduce emissions until the catalyst temperature is greater than or equal to the light-off temperature. The catalyst light-off period ends when the catalyst temperature is equal to the light-off temperature.

The ECM of the present disclosure uses the MPC module to optimize a balance between minimizing the catalyst light-off period and minimizing the emissions output by the engine during the catalyst light-off period. Accordingly, the overall amount of emissions that are output from the exhaust system of the engine when the engine is started are reduced. The MPC module may predict an enthalpy of exhaust gas produced by the engine for each of the possible sets of target values and determine the cost of each set based on a difference between the predicted exhaust enthalpy and a desired exhaust enthalpy. Exhaust enthalpy may refer to a total amount of energy in exhaust gas produced by an engine per unit time.

The cost of each possible set of target values may increase as the difference between the predicted exhaust enthalpy and the desired exhaust enthalpy increases and vice versa. During the catalyst light-off period, the MPC module may set the desired exhaust enthalpy to a value such that selecting the possible set having the lowest cost maximizes the exhaust enthalpy. Maximizing the exhaust enthalpy during the catalyst light-off period decreases the amount of tailpipe emissions.

In one example, a setpoint module generates the desired exhaust enthalpy based on a nonlinear relationship between states of the catalyst and the desired exhaust enthalpy. The catalyst states include a temperature of the catalyst, an concentration of oxygen in the catalyst, and/or a concentration of emissions in the exhaust system downstream for the catalyst. In another example, a second MPC module generates the desired exhaust enthalpy using a linear model of the catalyst.

Referring now to FIG. 1, an engine system 100 includes an engine 102 that combusts an air/fuel mixture to produce drive torque for a vehicle. The amount of drive torque produced by the engine 102 is based on a driver input from a driver input module 104. The engine 102 may be a gasoline spark ignition internal combustion engine.

Air is drawn into an intake manifold 110 through a throttle valve 112. For example, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, may be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a target air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. A spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. Generating spark may be referred to as a firing event. The spark actuator module 126 may have the ability to vary the timing of the spark for each firing event. The spark actuator module 126 may vary the spark timing for a next firing event when the spark timing is changed between a last firing event and the next firing event. The spark actuator module 126 may halt provision of spark to deactivated cylinders.

During the combustion stroke, the combustion of the air/fuel mixture drives the piston away from TDC, thereby driving the crankshaft. The combustion stroke may be defined as the time between the piston reaching TDC and the time at which the piston reaches bottom dead center (BDC). During the exhaust stroke, the piston begins moving away from BDC and expels the byproducts of combustion through an exhaust valve 130. The byproducts of combustion are exhausted from the vehicle via an exhaust system 134. The exhaust system 134 includes a catalyst 136, such as a three-way catalyst (TWC). The catalyst 136 reacts with one or more components of exhaust flowing through the catalyst 136. The catalyst 136 stores oxygen when the exhaust is fuel lean (oxygen rich).

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). In various other implementations, the intake valve 122 and/or the exhaust valve 130 may be controlled by devices other than camshafts, such as camless valve actuators. The cylinder actuator module 120 may deactivate the cylinder 118 by disabling opening of the intake valve 122 and/or the exhaust valve 130.

The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The engine system 100 may include a turbocharger that includes a hot turbine 160-1 that is powered by hot exhaust gases flowing through the exhaust system 134. The turbocharger also includes a cold air compressor 160-2 that is driven by the turbine 160-1. The compressor 160-2 compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) provided by the turbocharger. A boost actuator module 164 may control the boost of the turbocharger by controlling opening of the wastegate 162. In various implementations, two or more turbochargers may be implemented and may be controlled by the boost actuator module 164.

An air cooler (not shown) may transfer heat from the compressed air charge to a cooling medium, such as engine coolant or air. An air cooler that cools the compressed air charge using engine coolant may be referred to as an intercooler. An air cooler that cools the compressed air charge using air may be referred to as a charge air cooler. The compressed air charge may receive heat, for example, via compression and/or from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172 based on signals from the ECM 114.

An upstream oxygen sensor 176 measures an amount (e.g., concentration) of oxygen in the exhaust gas flowing into the catalyst 136. A downstream oxygen sensor 177 measures an amount (e.g., concentration) of oxygen in the exhaust gas downstream of the catalyst 136. The ECM 114 may use signals from the sensors and/or one or more other sensors to make control decisions for the engine system 100.

A position of the crankshaft may be measured using a crankshaft position sensor 180. A rotational speed of the crankshaft (an engine speed) may be determined based on the crankshaft position. A temperature of the engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. An ambient temperature of air being drawn into the engine 102 may be measured using an intake air temperature (IAT) sensor 192. The engine system 100 may also include one or more other sensors 193, such as a catalyst temperature sensor, an engine coolant temperature sensor, an ambient humidity sensor, one or more knock sensors, a compressor outlet pressure sensor and/or a throttle inlet pressure sensor, a wastegate position sensor, an EGR position sensor, and/or one or more other suitable sensors. The catalyst temperature sensor may be located in the exhaust system 134 upstream from the catalyst 136. The ECM 114 may use signals from the sensors to make control decisions for the engine system 100.

The ECM 114 may communicate with a transmission control module 194 to coordinate shifting gears in a transmission (not shown). For example, the ECM 114 may reduce engine torque during a gear shift. The ECM 114 may communicate with a hybrid control module 196 to coordinate operation of the engine 102 and an electric motor 198.

The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

Each system that varies an engine parameter may be referred to as an engine actuator. For example, the throttle actuator module 116 may adjust opening of the throttle valve 112 to achieve a target throttle opening area. The spark actuator module 126 controls the spark plugs to achieve a target spark timing relative to piston TDC. The fuel actuator module 124 controls the fuel injectors to achieve target fueling parameters. The phaser actuator module 158 may control the intake and exhaust cam phasers 148 and 150 to achieve target intake and exhaust cam phaser angles, respectively. The EGR actuator module 172 may control the EGR valve 170 to achieve a target EGR opening area. The boost actuator module 164 controls the wastegate 162 to achieve a target wastegate opening area. The cylinder actuator module 120 controls cylinder deactivation to achieve a target number of activated or deactivated cylinders.

The ECM 114 generates the target values for the engine actuators to cause the engine 102 to generate a target engine output torque. The ECM 114 generates the target values for the engine actuators using model predictive control, as discussed further below.

Figure 2:
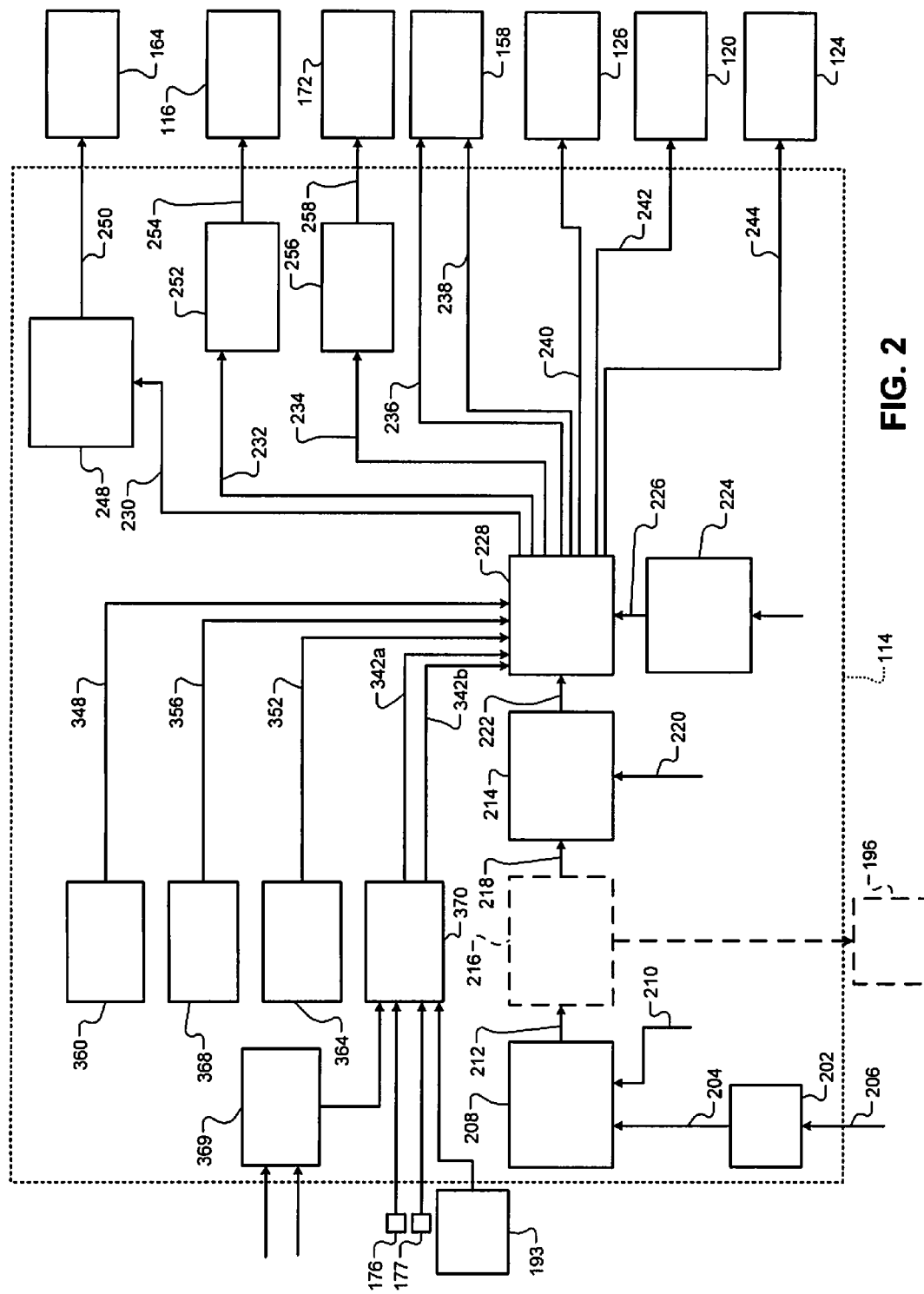
FIG. 2 is a functional block diagram of an example engine control system according to the present disclosure.

Referring now to FIG. 2, an example implementation of the ECM 114 includes a drive torque module. The driver torque module 202 determines a driver torque request 204 based on a driver input 206 from the driver input module 104. The driver input 206 may be based on, for example, a position of an accelerator pedal and a position of a brake pedal. The driver input 206 may also be based on cruise control, which may be an adaptive cruise control system that varies vehicle speed to maintain a predetermined following distance. The driver torque module 202 may store one or more mappings of accelerator pedal position to target torque and may determine the driver torque request 204 based on a selected one of the mappings. The driver torque module 202 may also apply one or more filters to rate limit changes in the driver torque request 204.

An axle torque arbitration module 208 arbitrates between the driver torque request 204 and other axle torque requests 210. Axle torque (torque at the wheels) may be produced by various sources including an engine and/or an electric motor. For example, the axle torque requests 210 may include a torque reduction requested by a traction control system when positive wheel slip is detected. Positive wheel slip occurs when axle torque overcomes friction between the wheels and the road surface, and the wheels begin to slip against the road surface. The axle torque requests 210 may also include a torque increase request to counteract negative wheel slip, where a tire of the vehicle slips in the other direction with respect to the road surface because the axle torque is negative.

The axle torque requests 210 may also include brake management requests and vehicle over-speed torque requests. Brake management requests may reduce axle torque to ensure that the axle torque does not exceed the ability of the brakes to hold the vehicle when the vehicle is stopped. Vehicle over-speed torque requests may reduce the axle torque to prevent the vehicle from exceeding a predetermined speed. The axle torque requests 210 may also be generated by vehicle stability control systems.

The axle torque arbitration module 208 outputs an axle torque request 212 based on the results of arbitrating between the received axle torque requests 204 and 210. As described below, the axle torque request 212 from the axle torque arbitration module 208 may selectively be adjusted by other modules of the ECM 114 before being used to control the engine actuators.

The axle torque arbitration module 208 may output the axle torque request 212 to a propulsion torque arbitration module 214. In various implementations, the axle torque arbitration module 208 may output the axle torque request 212 to a hybrid optimization module 216. The hybrid optimization module 216 may determine how much torque should be produced by the engine 102 and how much torque should be produced by the electric motor 198. The hybrid optimization module 216 then outputs a modified axle torque request 218 to the propulsion torque arbitration module 214.

The propulsion torque arbitration module 214 converts the axle torque request 212 (or the modified axle torque request 218) from an axle torque domain (torque at the wheels) into a propulsion torque domain (torque at the crankshaft). The propulsion torque arbitration module 214 arbitrates between the (converted) axle torque request 212 and other propulsion torque requests 220. The propulsion torque arbitration module 214 generates a propulsion torque request 222 as a result of the arbitration.

For example, the propulsion torque requests 220 may include torque reductions for engine over-speed protection, torque increases for stall prevention, and torque reductions requested by the transmission control module 194 to accommodate gear shifts. The propulsion torque requests 220 may also result from clutch fuel cutoff, which reduces the engine output torque when the driver depresses the clutch pedal in a manual transmission vehicle to prevent a flare in engine speed.

The propulsion torque requests 220 may also include an engine shutoff request, which may be initiated when a critical fault is detected. For example, critical faults may include detection of vehicle theft, a stuck starter motor, electronic throttle control problems, and unexpected torque increases. In various implementations, when an engine shutoff request is present, arbitration selects the engine shutoff request as the winning request. When the engine shutoff request is present, the propulsion torque arbitration module 214 may output zero as the propulsion torque request 222.

In various implementations, an engine shutoff request may simply shut down the engine 102 separately from the arbitration process. The propulsion torque arbitration module 214 may still receive the engine shutoff request so that, for example, appropriate data can be fed back to other torque requestors. For example, all other torque requestors may be informed that they have lost arbitration.

A torque reserve module 224 generates a torque reserve 226 to compensate for changes in engine operating conditions that may decrease engine output torque and/or to compensate for one or more loads. For example, the air/fuel ratio of the engine and/or the mass air flow may be directly varied, such as by diagnostic intrusive equivalence ratio testing and/or new engine purging. Before beginning these processes, the torque reserve module 224 may create or increase the torque reserve 226 to quickly offset decreases in engine output torque that result from leaning the air/fuel mixture during these processes.

The torque reserve module 224 may also create or increase the torque reserve 226 in anticipation of a future load, such as power steering pump operation or engagement of an air conditioning (NC) compressor clutch. The torque reserve module 224 may create or increase the torque reserve 226 for engagement of the NC compressor clutch when the driver first requests air conditioning. Then, when the NC compressor clutch engages, the torque reserve module 224 may decrease the torque reserve 226 by an amount equal to the estimated load of the A/C compressor clutch.

A target generating module 228 generates target values for the engine actuators based on the propulsion torque request 222, the torque reserve 226, and other parameters as discussed further below. The target generating module 228 generates the target values using model predictive control (MPC). The propulsion torque request 222 may be a brake torque. Brake torque may refer to torque at the crankshaft under the current operating conditions.

The target values include a target wastegate opening area 230, a target throttle opening area 232, a target EGR opening area 234, a target intake cam phaser angle 236, and a target exhaust cam phaser angle 238. The target values also include a target spark timing 240, a target number of cylinders to be activated 242, and target fueling parameters 244. The boost actuator module 164 controls the wastegate 162 to achieve the target wastegate opening area 230. For example, a first conversion module 248 may convert the target wastegate opening area 230 into a target duty cycle 250 to be applied to the wastegate 162, and the boost actuator module 164 may apply a signal to the wastegate 162 based on the target duty cycle 250. In various implementations, the first conversion module 248 may convert the target wastegate opening area 230 into a target wastegate position (not shown), and convert the target wastegate position into the target duty cycle 250.

The throttle actuator module 116 controls the throttle valve 112 to achieve the target throttle opening area 232. For example, a second conversion module 252 may convert the target throttle opening area 232 into a target duty cycle 254 to be applied to the throttle valve 112, and the throttle actuator module 116 may apply a signal to the throttle valve 112 based on the target duty cycle 254. In various implementations, the second conversion module 252 may convert the target throttle opening area 232 into a target throttle position (not shown), and convert the target throttle position into the target duty cycle 254.

The EGR actuator module 172 controls the EGR valve 170 to achieve the target EGR opening area 234. For example, a third conversion module 256 may convert the target EGR opening area 234 into a target duty cycle 258 to be applied to the EGR valve 170, and the EGR actuator module 172 may apply a signal to the EGR valve 170 based on the target duty cycle 258. In various implementations, the third conversion module 256 may convert the target EGR opening area 234 into a target EGR position (not shown), and convert the target EGR position into the target duty cycle 258.

The phaser actuator module 158 controls the intake cam phaser 148 to achieve the target intake cam phaser angle 236. The phaser actuator module 158 also controls the exhaust cam phaser 150 to achieve the target exhaust cam phaser angle 238. In various implementations, a fourth conversion module (not shown) may be included and may convert the target intake and exhaust cam phaser angles 236 and 238 into target intake and exhaust duty cycles, respectively. The phaser actuator module 158 may apply the target intake and exhaust duty cycles to the intake and exhaust cam phasers 148 and 150, respectively. In various implementations, the target generating module 228 may determine a target valve overlap factor and a target effective displacement, and the phaser actuator module 158 may control the intake and exhaust cam phasers 148 and 150 to achieve the target overlap factor and the target effective displacement.

The spark actuator module 126 provides spark based on the target spark timing 240. The cylinder actuator module 120 selectively activates and deactivates the valves of cylinders based on the target number of cylinders 242. Fueling and spark may also be disabled to cylinders that are deactivated. The target fueling parameters 244 may include, for example, a target number of fuel injections, a target mass of fuel for each injection, and target start timing for each injection. The fuel actuator module 124 controls fueling based on the target fueling parameters 244.

Figure 3:
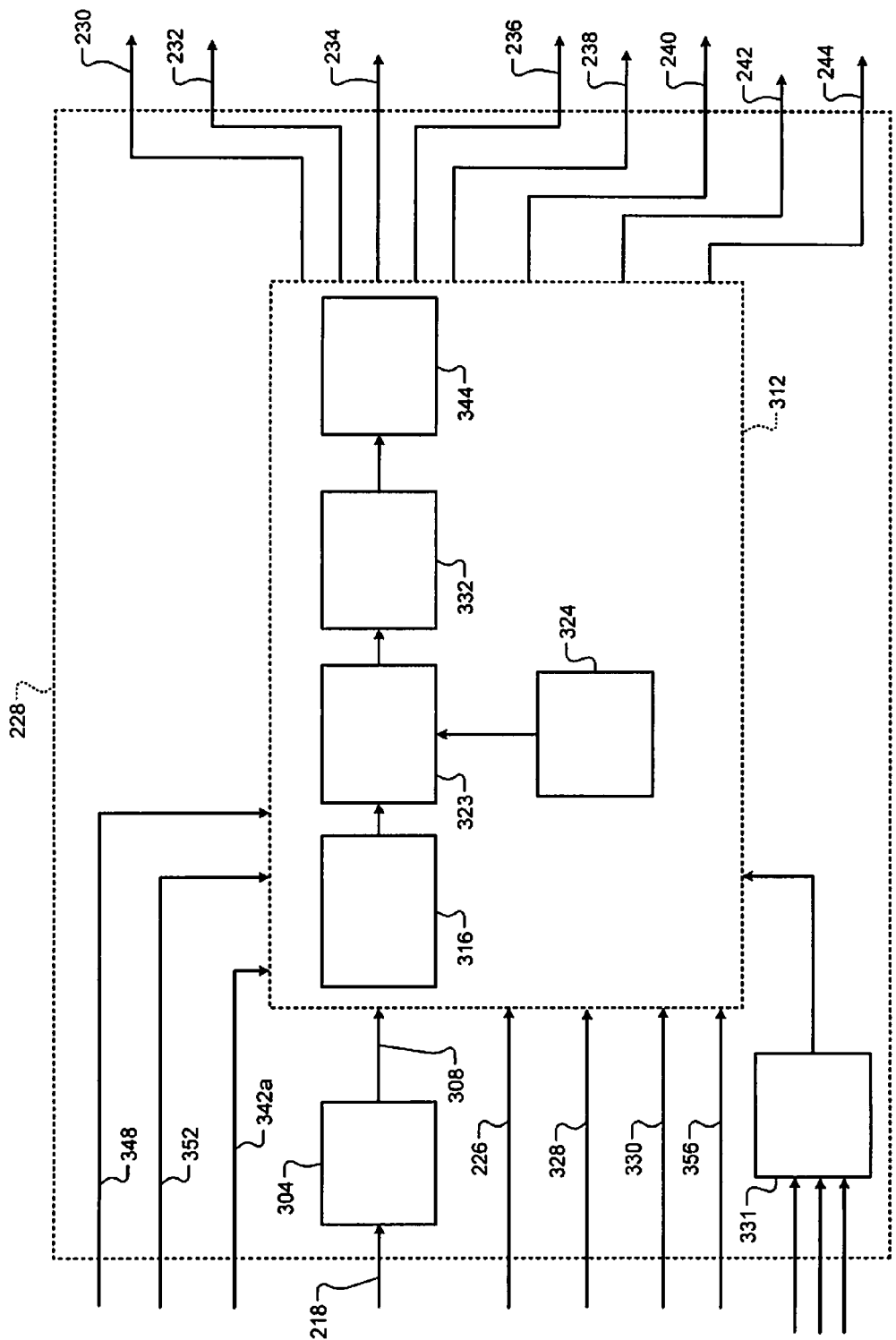
FIG. 3 is a functional block diagram of an example target generating module according to the present disclosure.

FIG. 3 is a functional block diagram of an example implementation of the target generating module 228. Referring now to FIGS. 2 and 3, as discussed above, the propulsion torque request 222 may be a brake torque. A torque conversion module 304 converts the propulsion torque request 222 from brake torque into base torque. The torque request resulting from conversion into base torque will be referred to as a base torque request 308.

Base torques may refer to torque at the crankshaft made during operation of the engine 102 on a dynamometer while the engine 102 is warm and no torque loads are imposed on the engine 102 by accessories, such as an alternator and the NC compressor. The torque conversion module 304 may convert the propulsion torque request 222 into the base torque request 308, for example, using a mapping or a function that relates brake torques to base torques. In various implementations, the torque conversion module 304 may convert the propulsion torque request 222 into another suitable type of torque, such as an indicated torque. An indicated torque may refer to a torque at the crankshaft attributable to work produced via combustion within the cylinders.

An MPC (model predictive control) module 312 generates the target values 230-244 using MPC. A sequence determination module 316 determines possible sequences of the target values 230-244 that could be used together during N future control loops. Each of the possible sequences identified by the sequence determination module 316 includes one sequence of N values for each of the target values 230-244. In other words, each possible sequence includes a sequence of N values for the target wastegate opening area 230, a sequence of N values for the target throttle opening area 232, a sequence of N values for the target EGR opening area 234, a sequence of N values for the target intake cam phaser angle 236, and a sequence of N values for the target exhaust cam phaser angle 238. Each possible sequence also includes a sequence of N values for the target spark timing 240, the target number of cylinders 242, and the target fueling parameters 244. Each of the N values corresponds to one of the N future control loops. N is an integer greater than or equal to one.

A prediction module 323 determines predicted responses of the engine 102 to the possible sequences of the target values 230-244, respectively, based on a mathematical model 324 of the engine 102, exogenous inputs 328, and feedback inputs 330. For example, based on a possible sequence of the target values 230-244, the exogenous inputs 328, and the feedback inputs 330, using the model 324, the prediction module 323 generates a sequence of N predicted torques of the engine 102 for the N control loops, a sequence of N predicted fuel consumptions of the engine 102 for the N control loops, a sequence of N predicted emissions in exhaust gas produced by the engine 102 for the N control loops, and a sequence of N predicted enthalpies of exhaust gas produced by the engine 102 for the N control loops. Exhaust enthalpy may refer to an amount of energy in exhaust gas produced by an engine per unit time. While the examples of predicted parameters described above include predicted torque, predicted fuel consumption, predicted emissions, and predicted exhaust enthalpy, the predicted parameters may include one or more other predicted operating parameters.

The model 324 may include a function or a mapping calibrated based on characteristics of the engine 102. The relationship between the responses of the engine 102, the target values 230-244, the exogenous inputs 328, and the feedback inputs 330 may be nonlinear over the entire range of possible engine speeds and engine loads. However, the model 324 may include a plurality of linear models that each correspond to an engine speed and load range. The prediction module 323 may select one of the models based on the current engine speed and load, and use the selected model to predict the responses of the engine 102. For example, a first model may be used in an engine speed range from 1000 revolutions per minute (RPM) to 2000 RPM and an engine load range from 100 Newton-meters (Nm) to 150 Nm. A second model may be used in an engine speed range from 1000 RPM to 2000 RPM and an engine load range from 150 Nm to 200 Nm. A third model may be used in an engine speed range from 2000 RPM to 3000 RPM and an engine load range from 100 Nm to 150 Nm.

The exogenous inputs 328 may include parameters that are not directly affected by the engine actuators. For example, the exogenous inputs 328 may include engine speed, turbocharger inlet air pressure, IAT, exhaust enthalpy, ambient humidity, ambient air temperature, vehicle speed, and/or one or more other parameters. The feedback inputs 330 may include, for example, an estimated torque output of the engine 102, an exhaust pressure downstream of the turbine 160-1 of the turbocharger, the IAT, an APC of the engine 102, an estimated residual dilution, an estimated external dilution, MAF, an air/fuel ratio of the engine 102, spark timing, and/or one or more other suitable parameters. The feedback inputs 330 may be measured using sensors (e.g., the IAT) and/or estimated based on one or more other parameters.

Dilution may refer to an amount of exhaust from a prior combustion event trapped within a cylinder for a combustion event. External dilution may refer to exhaust provided for a combustion event via the EGR valve 170. Residual dilution (also referred to as internal dilution) may refer to exhaust that remains in a cylinder and/or exhaust that is pushed back into the cylinder following the exhaust stroke of a combustion cycle.

Combustion phasing may refer to a crankshaft position where a predetermined amount of fuel injected is combusted within a cylinder relative to a predetermined crankshaft position for combustion of the predetermined amount of injected fuel. For example, combustion phasing may be expressed in terms of CA50 relative to a predetermined CA50. CA50 may refer to a crankshaft angle (CA) where 50 percent of a mass of injected fuel has been combusted within a cylinder. The predetermined CA50 may correspond to a CA50 where a maximum amount of work is produced from the fuel injected and may be approximately 8.5-approximately 10 degrees after TDC (top dead center) in various implementations. While combustion phasing will be discussed in terms of CA50 values, another suitable parameter indicative of combustion phasing may be used. Additionally, while combustion quality will be discussed as coefficient of variation (COV) of indicated mean effective pressure (IMEP) values, another suitable parameter indicative of combustion quality may be used.

An exhaust enthalpy module 331 may determine the current exhaust enthalpy based on a mass flow rate of exhaust gas produced by the engine 102, a temperature of the exhaust gas, and a chemical composition of the exhaust gas. For example, the exhaust enthalpy module 331 may determine the exhaust enthalpy based on a predetermined relationship between the exhaust gas flow rate, the exhaust gas temperature, the exhaust gas composition, and the exhaust enthalpy. The predetermined relationship may be embodied in a lookup table and may be nonlinear. The current exhaust enthalpy may be one of the exogenous inputs 328 and/or may be used to determine the predicted exhaust enthalpy.

A cost module 332 determines a cost value for each of the possible sequences of the target values 230-244 based on the predicted parameters determined for a possible sequence and reference values 356. In some implementations, the cost module 332 may determine the cost value for each of the possible sequences based on one or more relationships between the predicted exhaust enthalpy and an exhaust enthalpy setpoint 342a. The exhaust enthalpy setpoint 342a may refer to a target amount of energy in exhaust gas produced by the engine 102 per unit time. The cost module 332 may determine the cost for each of the possible sequences of the target values 266-270 based on the periods for the predicted exhaust enthalpy to reach the exhaust enthalpy setpoint 342a. Additionally or alternatively, the cost module 332 may determine the cost for each of the possible sequences of the target values 266-270 based on the amounts that the predicted exhaust enthalpy overshoots or undershoots the exhaust enthalpy setpoint 342a. For example, the cost may increase as the period for a predicted exhaust enthalpy to reach the exhaust enthalpy setpoint 342a increases and/or as the amount that the predicted exhaust enthalpy overshoots or undershoots the exhaust enthalpy setpoint 342a increases.

The relationships between the predicted exhaust enthalpy and the exhaust enthalpy setpoint 342a may be weighted to affect how much the relationship between the predicted exhaust enthalpy and the exhaust enthalpy setpoint 342a affects the cost. For example, the relationship between the predicted exhaust enthalpy and the exhaust enthalpy setpoint 342a may be weighted to affect the cost more than the relationship between another predicted parameter and the corresponding reference value.

In another example, the cost may be determined based on a difference between the predicted exhaust enthalpy and the exhaust enthalpy setpoint 342a. As discussed below, the MPC module 312 may control the engine actuators based on the one of the possible sequences of the target values 266-270 having the lowest cost. Thus, exhaust enthalpy may be a control term that is optimized and tracked by the MPC module 312. An example cost determination is discussed further below.

In other implementations, the cost module 332 may determine the cost value for each of the possible sequences based on one or more relationships between a predicted exhaust temperature and an exhaust temperature setpoint 342b. The exhaust temperature setpoint 342b may refer to a target temperature of exhaust gas produced by the engine 102 per unit time. The cost module 332 may determine the cost for each of the possible sequences of the target values 266-270 based on the periods for the predicted exhaust temperature to reach the exhaust temperature setpoint 342b. Additionally or alternatively, the cost module 332 may determine the cost for each of the possible sequences of the target values 266-270 based on the amounts that the predicted exhaust temperature overshoots or undershoots the exhaust temperature setpoint 342b. For example, the cost may increase as the period for a predicted exhaust temperature to reach the exhaust temperature setpoint 342b increases and/or as the amount that the predicted exhaust temperature overshoots or undershoots the exhaust temperature setpoint 342b increases.

The relationships between the predicted exhaust temperature and the exhaust temperature setpoint 342b may be weighted to affect how much the relationship between the predicted exhaust temperature and the exhaust temperature setpoint 342b affects the cost. For example, the relationship between the predicted exhaust temperature and the exhaust temperature setpoint 342b may be weighted to affect the cost more than the relationship between another predicted parameter and the corresponding reference value. An example cost determination is discussed further below.

A selection module 344 selects one of the possible sequences of the target values 230-244 based on the respective costs of the possible sequences. For example, the selection module 344 may select the one of the possible sequences having the lowest cost while satisfying actuator constraints 348 and output constraints 352.

In various implementations, satisfaction of the output constraints 352 may be considered in the cost determination. In other words, the cost module 332 may determine the cost values further based on the output constraints 352. As discussed further below, based on how the cost values are determined, the selection module 344 will select the one of the possible sequences that best achieves the base torque request 308 and maximizes the exhaust enthalpy.

The selection module 344 may set the target values 230-244 to the first ones of the N values of the selected possible sequence, respectively. In other words, the selection module 344 sets the target wastegate opening area 230 to the first one of the N values in the sequence of N values for the target wastegate opening area 230, set the target throttle opening area 232 to the first one of the N values in the sequence of N values for the target throttle opening area 232, set the target EGR opening area 234 to the first one of the N values in the sequence of N values for the target EGR opening area 234, set the target intake cam phaser angle 236 to the first one of the N values in the sequence of N values for the target intake cam phaser angle 236, and set the target exhaust cam phaser angle 238 to the first one of the N values in the sequence of N values for the target exhaust cam phaser angle 238. The selection module 344 also sets the target spark timing 240 to the first one of the N values in the sequence of N values for the target spark timing 240, the target number of cylinders 242 to the first one of the N values in the sequence of N values for the target number of cylinders 242, and the target fueling parameters 244 to the first one of the N values in the sequence of N values for the target fueling parameters 244.

During a next control loop, the MPC module 312 identifies possible sequences, generates the predicted parameters for the possible sequences, determines the cost of each of the possible sequences, selects of one of the possible sequences, and sets of the target values 230-244 to the first set of the target values 230-244 in the selected possible sequence. This process continues for each control loop.

An actuator constraint module 360 (see FIG. 2) sets the actuator constraints 348 for each of the target values 230-244. In other words, the actuator constraint module 360 sets actuator constraints for the throttle valve 112, actuator constraints for the EGR valve 170, actuator constraints for the wastegate 162, actuator constraints for the intake cam phaser 148, and actuator constraints for the exhaust cam phaser 150. The actuator constraint module 360 also sets actuator constraints for the spark actuator module 126, actuator constraints for the cylinder actuator module 120, and actuator constraints for the fuel actuator module 124.

The actuator constraints 348 for each one of the target values 230-244 may include a maximum value for an associated target value and a minimum value for that target value. The actuator constraint module 360 may generally set the actuator constraints 348 to predetermined operational ranges for the associated engine actuators. More specifically, the actuator constraint module 360 may generally set the actuator constraints 348 to predetermined operational ranges for the throttle valve 112, the EGR valve 170, the wastegate 162, the intake cam phaser 148, the exhaust cam phaser 150, the spark actuator module 126, the cylinder actuator module 120, and the fuel actuator module 124, respectively.

An output constraint module 364 (see FIG. 2) sets the output constraints 352 for the predicted torque output of the engine 102, the predicted air/fuel ratio, and the predicted exhaust enthalpy. The output constraints 352 for each one of the predicted parameters may include a maximum value for an associated predicted parameter and a minimum value for that predicted parameter. For example, the output constraints 352 may include a minimum torque, a maximum torque, a minimum air/fuel ratio, a maximum air/fuel ratio, a minimum exhaust enthalpy, and a maximum exhaust enthalpy.

The output constraint module 364 may generally set the output constraints 352 to predetermined ranges for the associated predicted parameters, respectively. However, the output constraint module 364 may vary one or more of the output constraints 352 under some circumstances.

A reference module 368 (see FIG. 2) generates the reference values 356 for the target values 230-244, respectively. The reference values 356 include a reference for each of the target values 230-244. In other words, the reference values 356 include a reference wastegate opening area, a reference throttle opening area, a reference EGR opening area, a reference intake cam phaser angle, and a reference exhaust cam phaser angle. The reference values 356 also include a reference spark timing, a reference number of cylinders, and reference fueling parameters.

The reference module 368 may determine the reference values 356, for example, based on the propulsion torque request 222 and/or the base torque request 308. The reference values 356 provide references for setting the target values 230-244, respectively. The reference values 356 may be used to determine the cost values for possible sequences, as discussed further below. The reference values 356 may also be used for one or more other reasons, such as by the sequence determination module 316 to determine possible sequences.

In some implementations, a catalyst light-off module 369 determines whether a catalyst light-off period is required when the engine 102 is started. The catalyst light-off period may begin when the engine 102 is started and the catalyst temperature is less than a light-off or activation temperature. The catalyst 136 may not effectively reduce emissions until the temperature of the catalyst 136 is greater than or equal to the activation temperature. The catalyst light-off period may end when the catalyst temperature is equal to the activation temperature.

In one example, the catalyst light-off module 369 receives an engine coolant temperature and an estimated exhaust enthalpy. The engine coolant temperature may be sensed by the other sensors 193. The catalyst light-off module 369 determines whether the engine coolant temperature is within an engine coolant temperature window. For example only, the engine coolant temperature window may include an upper engine coolant threshold and a lower engine coolant threshold. The catalyst light-off module 369 determines the engine coolant temperature is within the engine coolant window when the engine coolant temperature is greater than the lower engine coolant threshold and less than the upper engine coolant threshold.

When the catalyst light-off module 369 determines the engine coolant temperature is within the engine coolant temperature window, then catalyst light-off module 269 determines whether the estimated exhaust enthalpy is less than a first enthalpy threshold. When the catalyst light-off module 369 determines the exhaust enthalpy is less than the first enthalpy threshold, the catalyst light-off module 369 determines a catalyst light-off period is required. The catalyst light-off module 369 generates a catalyst light-off entry signal. The catalyst light-off module 369 communicates the catalyst light-off entry signal to a setpoint module 370. The setpoint module 370 initiates a catalyst light-off period based on the catalyst light-off entry signal.

In another implementation, the catalyst light-off module 369 generates the catalyst light-off entry signal when the engine coolant temperate is within the engine coolant temperature window. In yet another implementation, the catalyst light-off module 369 generates the catalyst light-off entry signal when the estimated exhaust enthalpy is less than the first enthalpy threshold. In other words, the catalyst light-off module 369 may be configured to generate the catalyst light-off entry signal based on: the engine coolant temperature being within the engine coolant temperature window and the estimated exhaust enthalpy being less than the first enthalpy threshold; the engine coolant temperature being within the engine coolant temperature window; and/or the estimated exhaust enthalpy being less than the first enthalpy threshold.

The catalyst light-off module 369 determines whether to exit a catalyst light-off period based on the estimated exhaust enthalpy. For example, the catalyst light-off module 369 receives the estimated exhaust enthalpy during a catalyst light-off period. It is understood that the catalyst light-off module 369 may periodically or continuously receive a plurality of estimated, sensed, and measured values. For example, the catalyst light-off module 369 may periodically or continuously receive the estimated exhaust enthalpy. The catalyst light-off module 369 determines whether the estimated exhaust enthalpy is greater than a second enthalpy threshold. The second enthalpy threshold may be the same or different than the first enthalpy threshold.

When the catalyst light-off module 369 determines the estimated exhaust enthalpy is greater than the second enthalpy threshold, the catalyst light-off module 369 determines to exit the catalyst light-off period. The catalyst light-off module 369 generates a catalyst light-off exit signal. The catalyst light-off module 369 communicates the catalyst light-off signal to the setpoint module 370. The setpoint module 370 ends the catalyst light-off period based on the catalyst light-off exit signal.

The catalyst light-off module 369 may continuously monitor the estimated exhaust enthalpy. The catalyst light-off module 369 determines whether the estimated exhaust enthalpy is less than a third enthalpy threshold. The third enthalpy threshold may be the same or different than the first enthalpy threshold. When the catalyst light-off module 369 determines the estimated exhaust enthalpy has dropped below the third enthalpy threshold, the catalyst light-off module 369 generates a catalyst light-off not required signal. The catalyst light-off module 369 communicates the catalyst light-off not required signal to the setpoint module 370.

In another implementation, the catalyst light-off module 369 receives an engine coolant temperature and an estimated exhaust temperature. The engine coolant temperature may be sensed by the other sensors 193. The catalyst light-off module 369 determines whether the engine coolant temperature is within an engine coolant temperature window. For example only, the engine coolant temperature window may include an upper engine coolant threshold and a lower engineer coolant threshold. The catalyst light-off module 369 determines the engine coolant temperature is within the engine coolant window when the engine coolant temperature is greater than the lower engine coolant threshold and less than the upper engine coolant threshold.

When the catalyst light-off module 369 determines the engine coolant temperature is within the engine coolant temperature window, the catalyst light-off module 269 determines whether the estimated exhaust temperature is less than a first temperature threshold. When the catalyst light-off module 369 determines the exhaust temperature is less than the first temperature threshold, the catalyst light-off module 369 determines a catalyst light-off period is required. The catalyst light-off module 369 generates a catalyst light-off entry signal. The catalyst light-off module 369 communicates the catalyst light-off entry signal to a setpoint module 370. The setpoint module 370 initiates a catalyst light-off period based on the catalyst light-off entry signal In another implementation, the catalyst light-off module 369 generates the catalyst light-off entry signal when the engine coolant temperate is within the engine coolant temperature window. In yet another implementation, the catalyst light-off module 369 generates the catalyst light-off entry signal when the estimated exhaust temperature is less than the first temperature threshold. In other words, the catalyst light-off module 369 may be configured to generate the catalyst light-off entry signal based on: the engine coolant temperature being within the engine coolant temperature window and the estimated exhaust temperature being less than the first temperature threshold; the engine coolant temperature being within the engine coolant temperature window; or the estimated exhaust temperature being less than the first temperature threshold.

The catalyst light-off module 369 determines whether to exit a catalyst light-off period based on the estimated exhaust temperature. For example, the catalyst light-off module 369 receives the estimated exhaust temperature during a catalyst light-off period. It is understood that the catalyst light-off module 369 may periodically or continuously receive a plurality of estimated, sensed, and measured values. For example, the catalyst light-off module 369 may periodically or continuously receive the estimated exhaust temperature. The catalyst light-off module 369 determines whether the estimated exhaust temperature is greater than a second temperature threshold. The second temperature threshold may be the same or different than the first temperature threshold.

When the catalyst light-off module 369 determines the estimated exhaust temperature is greater than the second temperature threshold, the catalyst light-off module 369 determines to exit the catalyst light-off period. The catalyst light-off module 369 generates a catalyst light-off exit signal. The catalyst light-off module 369 communicates the catalyst light-off signal to the setpoint module 370. The setpoint module 370 ends the catalyst light-off period based on the catalyst light-off exit signal.

The catalyst light-off module 369 continuously monitors the estimated exhaust temperature. The catalyst light-off module 369 determines whether the estimated exhaust temperature is less than a third temperature threshold. The third temperature threshold may be the same or different than the first temperature threshold. When the catalyst light-off module 369 determines the estimated exhaust temperature has dropped below the third temperature threshold, the catalyst light-off module 369 generates a catalyst light-off not required signal. The catalyst light-off module 369 communicates the catalyst light-off not required signal to the setpoint module 370.

The setpoint module 370 generates the exhaust enthalpy setpoint 342$a$ based on the concentration of oxygen in the catalyst 136, the temperature of the catalyst 136, and the concentrations of emissions downstream from the catalyst 136. The setpoint module 370 may determine the concentration of oxygen in the catalyst 136 based on the oxygen concentrations received from the upstream and downstream oxygen sensors 176 and 177. The setpoint module 370 may determine the temperature of the catalyst 136 based on the exhaust gas temperature, which the setpoint module 370 may receive from the other sensors 193. The setpoint module 370 may also receive the concentrations of emissions such as hydrocarbon, nitrogen oxide, and carbon monoxide from the other sensors 193.

In one implementation, the setpoint module 370 may generate the exhaust enthalpy setpoint 342a based on a predetermined relationship between the oxygen concentration, the catalyst temperature, the emissions concentration, and the exhaust enthalpy setpoint 342a. The predetermined relationship may be embodied in a lookup table and may be nonlinear. The setpoint module 370 may adjust the exhaust enthalpy setpoint 342a to minimize a catalyst light-off period and to minimize the amount of emissions present in exhaust gas produced by the engine 102 during the catalyst light-off period. In one example, the setpoint module 370 may adjust the exhaust enthalpy setpoint 342a to a high value at the beginning of the catalyst light-off period, and then decrease the exhaust enthalpy setpoint 342a over the catalyst light-off period.

In another implementation, the setpoint module 370 may generate the exhaust temperature setpoint 342b based on a predetermined relationship between the catalyst temperature, the emissions concentration, and the exhaust temperature setpoint 342b. The predetermined relationship may be embodied in a lookup table and may be nonlinear. The setpoint module 370 may adjust the exhaust temperature setpoint 342b to minimize a catalyst light-off period and to minimize the amount of emissions present in exhaust gas produced by the engine 102 during the catalyst light-off period. In one example, the setpoint module 370 may adjust the exhaust temperature setpoint 342b to a high value at the beginning of the catalyst light-off period, and then decrease the exhaust temperature setpoint 342b over the catalyst light-off period.

Instead of or in addition to generating sequences of possible target values and determining the cost of each of the sequences, the MPC module 312 may identify a sequence of possible target values having the lowest cost using convex optimization techniques. For example, the MPC module 312 may determine the target values 230-244 using a quadratic programming (QP) solver, such as a Dantzig QP solver. In another example, the MPC module 312 may generate a surface of cost values for the possible sequences of the target values 230-244 and, based on the slope of the cost surface, identify a sequence of possible target values having the lowest cost. The MPC module 312 may then test that sequence of possible target values to determine whether that sequence of possible target values satisfies the actuator constraints 348. If so, the MPC module 312 may set the target values 230-244 to the first ones of the N values of that selected possible sequence, respectively, as discussed above.

If the actuator constraints 348 are not satisfied, the MPC module 312 selects another sequence of possible target values with a next lowest cost and tests that sequence of possible target values for satisfaction of the actuator constraints 348. The process of selecting a sequence and testing the sequence for satisfaction of the actuator constraints 348 may be referred to as an iteration. Multiple iterations may be performed during each control loop.

The MPC module 312 performs iterations until a sequence with the lowest cost that satisfies the actuator constraints 348 is identified. In this manner, the MPC module 312 selects the sequence of possible target values having the lowest cost while satisfying the actuator constraints 348 and the output constraints 352. If a sequence cannot be identified, the MPC module 312 may indicate that no solution is available.

The cost module 332 may determine the cost for the possible sequences of the target values 230-244 based on relationships between: the predicted torque and the base torque request 308; the predicted fuel consumption and a predetermined minimum fuel consumption; the predicted emissions and a predetermined minimum particle emissions; the predicted exhaust enthalpy and a predetermined maximum exhaust enthalpy; and the possible target values and the respective actuator constraints 348. The relationships may be weighted, for example, to control the effect that each of the relationships has on the cost.

For example, the cost module 332 may determine the cost for a possible sequence of the target values 230-244 based on the following equation:

$$\text{Cost} = \sum_{i=1}^{N} \mu \epsilon^2 + \|wT^*(TP_i - BTR_i)\|^2 + \|wFC^*(FCP_i - \text{Min}FC)\|^2 + \|wPE^*(PEP_i - \text{Min}PE)\|^2 + \|wEE^* (EEP_i - EESP)\|^2,$$

subject to the actuator constraints 348 and the output constraints 352. Cost is the cost for the possible sequence of the target values 230-244, TPi is the predicted torque of the engine 102 for an i-th one of the N control loops, BTRi is the base torque request 308 for the i-th one of the N control loops, and wT is a weighting value associated with the relationship between the predicted torque and the base torque request.

FCPi is the predicted fuel consumption for the i-th one of the N control loops, MinFC is the predetermined minimum fuel consumption, and wFC is a weighting value associated with the relationship between the predicted fuel consumption and the predetermined minimum fuel consumption. PEPi is the predicted particle emissions for the i-th one of the N control loops, MinPE is the predetermined minimum particle emissions, and wPE is a weighting value associated with the relationship between the predicted particle emissions and the predetermined minimum particle emissions. EEPi is the predicted exhaust enthalpy for the i-th one of the N control loops, EESP is the exhaust enthalpy setpoint 342a, and wEE is a weighting value associated with the relationship between the predicted exhaust enthalpy and the exhaust enthalpy setpoint 342a.

The above equation can be expanded to:

$$\text{Cost} = \sum_{i=1}^{N} \rho \epsilon^2 + \|wT^*(TP_i - BTR_i)\|^2 + \|wFC^*(FCP_i - \text{Min}FC)\|^2 + \|wPE^*(PEP_i - \text{Min}PE)\|^2 + \|wEE^* (EEP_i - EESP)\|^2 + \|wTV^*(PTTOi - TORefi)\|^2 + \|wWG^*(PTWGOi - EGORefi)\|^2 + \|wEGR^* (PTEGROi - EGRORefi)\|^2 + \|wIP^*(PTICPi - ICPRefi)\|^2 + \|wEP^*(PTECPi - ECPRefi)\|^2 + \|wS^*(PSi - SRefi)\|^2 + \|wN^*(PNi - NRefi)\|^2 + \|wF^* (PFi - FRefi)\|^2,$$

subject to the actuator constraints 348 and the output constraints 352. PTTOi is a possible target throttle opening for the i-th one of the N control loops, TORef is the reference throttle opening for the i-th one of the N control loops, and wTV is a weighting value associated with the relationship between the possible target throttle openings and the reference throttle openings. PTWGOi is a possible target wastegate opening for the i-th one of the N control loops, WGORef is the reference wastegate opening for the i-th one of the N control loops, and wWG is a weighting value associated with the relationship between the possible target wastegate openings and the reference wastegate openings.

PTEGROi is a possible target EGR opening for the i-th one of the N control loops, EGRRef is the reference EGR opening for the i-th one of the N control loops, and wEGR is a weighting value associated with the relationship between the possible target EGR openings and the reference EGR openings. PTICi is a possible target intake cam phaser angle for the i-th one of the N control loops, ICPRef is the reference intake cam phaser angle for the i-th one of the N control loops, and wIP is a weighting value associated with the relationship between the possible target intake cam phaser angle and the reference intake cam phaser angles. PTECi is a possible target exhaust cam phaser angle for the i-th one of the N control loops, ECPRef is the reference exhaust cam phaser angle for the i-th one of the N control loops, and wEP is a weighting value associated with the relationship between the possible target exhaust cam phaser angle and the reference exhaust cam phaser angles.

PSi is a possible target spark timing for the i-th one of the N control loops, SRef is the reference spark timing for the i-th one of the N control loops, and wS is a weighting value associated with the relationship between the possible target spark timings and the reference spark timings. PNi is a possible number of cylinders for the i-th one of the N control loops, NRef is the reference number of cylinders for the i-th one of the N control loops, and wN is a weighting value associated with the relationship between the possible number of cylinders and the reference number of cylinders. PFi is possible fueling for the i-th one of the N control loops, FRef is the reference fueling for the i-th one of the N control loops, and wF is a weighting value associated with the relationship between the possible fueling and the reference fueling.

$\rho$ is a weighting value associated with satisfaction of the output constraints 352. $\epsilon$ is a variable that the cost module 332 may set based on whether the output constraints 352 will be satisfied. For example, the cost module 332 may increase $\epsilon$ when a predicted parameter is greater than or less than the corresponding minimum or maximum value (e.g., by at least a predetermined amount). The cost module 332 may set $\epsilon$ to zero when all of the output constraints 352 are satisfied. $\rho$ may be greater than the weighting value wT, the weighting value wFC, the weighting value wPE, the weighting value wEE, and the other weighting values (wTV, wWG, wEGR, wIP, wEP, wS, wN, wF) such that the cost determined for a possible sequence will be large if one or more of the output constraints 352 are not satisfied. This may prevent selection of a possible sequence where one or more of the output constraints 352 are not satisfied.

The weighting value wT may be greater than the weighting value wFC, the weighting value wPE, the weighting value wEE, and the weighting values wTV, wWG, wEGR, wIP, wEP, wS, wN, and wF. In this manner, the relationship between the predicted engine torque and the base torque request 308 have a larger effect on the cost and, therefore, the selection of one of the possible sequences as discussed further below. The cost increases as the difference between the predicted engine torque and the base torque request 308 increases and vice versa.

The weighting value wFC, the weighting value wPE, and the weighting value wEE may be greater than the weighting values wTV, wWG, wEGR, wIP, wEP, wS, wN, and wF. In this manner, the relationship between the predicted fuel consumption and the predetermined minimum fuel consumption, the relationship between the predicted particle emissions and the predetermined minimum particle emissions, and the relationship between the predicted exhaust enthalpy and the exhaust enthalpy setpoint 342a have larger effects on the cost. As the selection module 344 may select the one of the possible sequences having the lowest cost, the selection module 344 may select the one of the possible sequences that best achieves the base torque request 308 and the exhaust enthalpy setpoint 342a while minimizing the fuel consumption and the particle emissions.

The weighting values wTV, wWG, wEGR, wIP, wEP, wS, wN, and wF may be less than all of the other weighting values. In this manner, during steady-state operation, the target values 230-244 may settle near or at the reference values 356. During the catalyst light-off period, however, the MPC module 312 may adjust the target values 230-244 away from the reference values 356 in order to more closely track the base torque request 308, minimize the fuel consumption, minimize the particle emissions, and maximize the exhaust enthalpy while satisfying the actuator constraints 348 and the output constraints 352.

Figure 4:
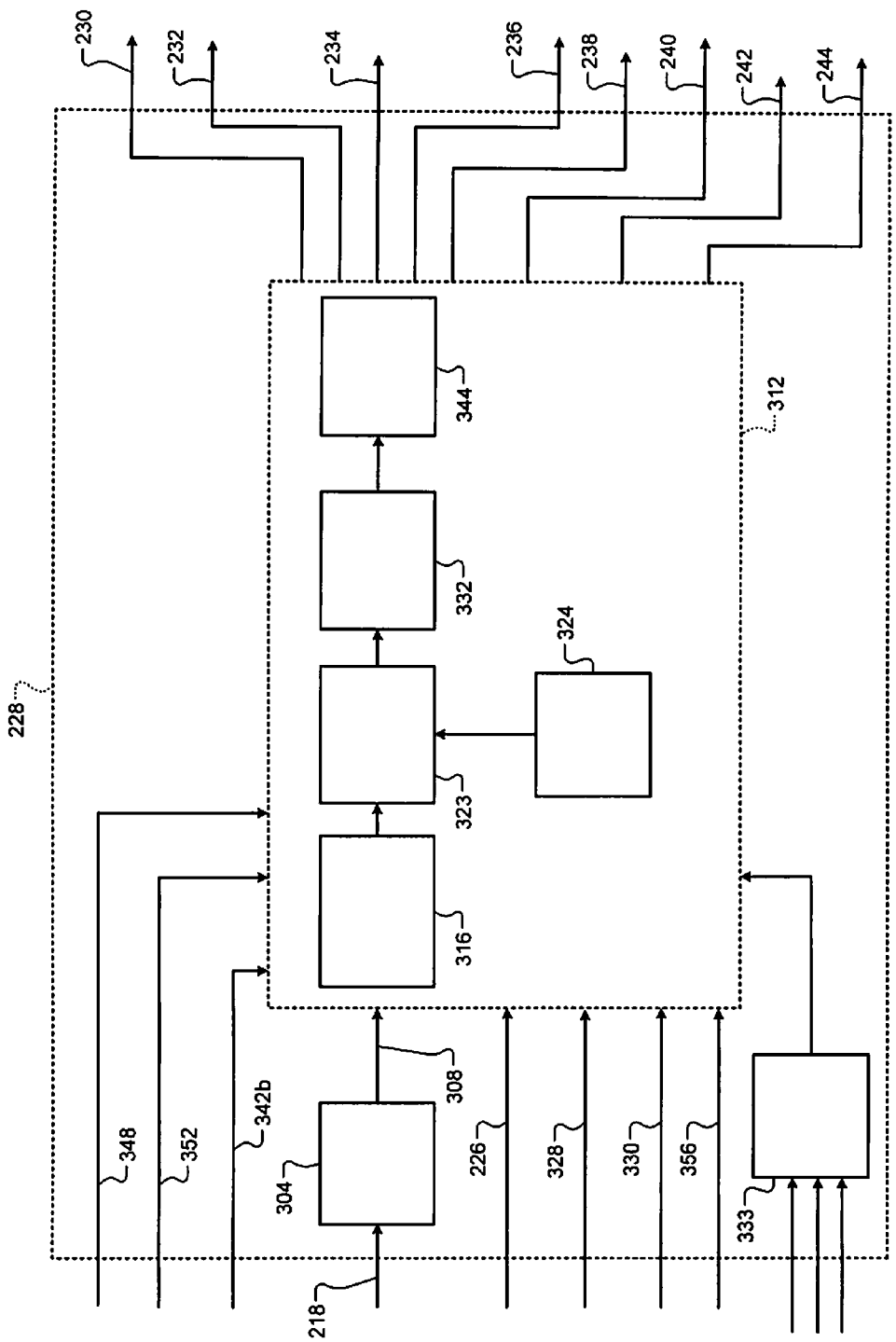
FIG. 4 is a functional block diagram of an alternative example target generating module according to the present disclosure.

FIG. 4 is a functional block diagram of an alternative example implementation of the target generating module 228. The target generating module 228 includes an exhaust temperature estimation module 333 that estimates the current exhaust temperature based on a mass flow rate of exhaust gas produced by the engine 102, a previously measured or unmeasured temperature of the catalyst, and a chemical composition of the exhaust gas. For example, the exhaust temperature module 333 may determine the exhaust temperature based on a predetermined relationship between the exhaust gas flow rate, the temperature of the catalyst, the exhaust gas composition, and the previously measured or unmeasured exhaust temperature. The predetermined relationship may be embodied in a lookup table and may be nonlinear. The current exhaust temperature may be one of the exogenous inputs 328 and/or may be used to determine the predicted exhaust temperature.

The cost module 332 determines a cost value for each of the possible sequences of the target values 230-244 based on the predicted parameters determined for a possible sequence and reference values 356. The cost module 332 may determine the cost value for each of the possible sequences based on one or more relationships between the predicted exhaust temperature and an exhaust temperature setpoint 342b. The exhaust temperature setpoint 342b may refer to a target amount of energy in exhaust gas produced by the engine 102 per unit time. The cost module 332 may determine the cost for each of the possible sequences of the target values 266-270 based on the periods for the predicted exhaust temperature to reach the exhaust temperature setpoint 342b. Additionally or alternatively, the cost module 332 may determine the cost for each of the possible sequences of the target values 266-270 based on the amounts that the predicted exhaust temperature overshoots or undershoots the exhaust temperature setpoint 342b. For example, the cost may increase as the period for a predicted exhaust temperature to reach the exhaust temperature setpoint 342b increases and/or as the amount that the predicted exhaust temperature overshoots or undershoots the exhaust temperature setpoint 342b increases.

The relationships between the predicted exhaust temperature and the exhaust temperature setpoint 342b may be weighted to affect how much the relationship between the predicted exhaust temperature and the exhaust temperature setpoint 342b affects the cost. For example, the relationship between the predicted exhaust temperature and the exhaust temperature setpoint 342b may be weighted to affect the cost more than the relationship between another predicted parameter and the corresponding reference value. An example cost determination is discussed further below.

The output constraint module 364 (see FIG. 2) sets the output constraints 352 for the predicted torque output of the engine 102, the predicted air/fuel ratio, and the predicted exhaust temperature. As described above, the output constraints 352 for each one of the predicted parameters may include a maximum value for an associated predicted parameter and a minimum value for that predicted parameter. For example, the output constraints 352 may include a minimum torque, a maximum torque, a minimum air/fuel ratio, a maximum air/fuel ratio, a minimum exhaust temperature, and a maximum exhaust temperature.

The output constraint module 364 may generally set the output constraints 352 to predetermined ranges for the associated predicted parameters, respectively. However, the output constraint module 364 may vary one or more of the output constraints 352 under some circumstances.

The setpoint module 370 generates the exhaust temperature setpoint 342b based on the concentration of oxygen in the catalyst 136, the temperature of the catalyst 136, and the concentrations of emissions downstream from the catalyst 136. The setpoint module 370 may determine the concentration of oxygen in the catalyst 136 based on the oxygen concentrations received from the upstream and downstream oxygen sensors 176 and 177. The setpoint module 370 may determine the temperature of the catalyst 136 based on the exhaust gas temperature, which the setpoint module 370 may receive from the other sensors 193. The setpoint module 370 may also receive the concentrations of emissions such as hydrocarbon, nitrogen oxide, and carbon monoxide from the other sensors 193.

The setpoint module 370 may generate the exhaust temperature setpoint 342b based on a predetermined relationship between the oxygen concentration, the catalyst temperature, the emissions concentration, and the exhaust temperature setpoint 342b. The predetermined relationship may be embodied in a lookup table and may be nonlinear. The setpoint module 370 may adjust the exhaust temperature setpoint 342b to minimize a catalyst light-off period and to minimize the amount of emissions present in exhaust gas produced by the engine 102 during the catalyst light-off period. In one example, the setpoint module 370 may adjust the exhaust temperature setpoint 342b to a high value at the beginning of the catalyst light-off period, and then decrease the exhaust temperature setpoint 342b over the catalyst light-off period.

The catalyst light-off period may begin when the engine 102 is started and the catalyst temperature is less than a light-off or activation temperature. The catalyst 136 may not effectively reduce emissions until the temperature of the catalyst 136 is greater than or equal to the activation temperature. The catalyst light-off period may end when the catalyst temperature is equal to the activation temperature.

As described above with respect to FIG. 3, the MPC module 312 may determine the target values 230-244 using a QP solver, such as a Dantzig QP solver. For example, the MPC module 312 may generate a surface of cost values for the possible sequences of the target values 230-244 and, based on the slope of the cost surface, identify a sequence of possible target values having the lowest cost. The MPC module 312 may then test that sequence of possible target values to determine whether that sequence of possible target values satisfies the actuator constraints 348. If so, the MPC module 312 may set the target values 230-244 to the first ones of the N values of that selected possible sequence, respectively, as discussed above.

If the actuator constraints 348 are not satisfied, the MPC module 312 selects another sequence of possible target values with a next lowest cost and tests that sequence of possible target values for satisfaction of the actuator constraints 348. The process of selecting a sequence and testing the sequence for satisfaction of the actuator constraints 348 may be referred to as an iteration. Multiple iterations may be performed during each control loop.

The MPC module 312 performs iterations until a sequence with the lowest cost that satisfies the actuator constraints 348 is identified. In this manner, the MPC module 312 selects the sequence of possible target values having the lowest cost while satisfying the actuator constraints 348 and the output constraints 352. If a sequence cannot be identified, the MPC module 312 may indicate that no solution is available.

The cost module 332 may determine the cost for the possible sequences of the target values 230-244 based on relationships between: the predicted torque and the base torque request 308; the predicted fuel consumption and a predetermined minimum fuel consumption; the predicted emissions and a predetermined minimum particle emissions; the predicted exhaust temperature and a predetermined maximum exhaust temperature; and the possible target values and the respective actuator constraints 348. The relationships may be weighted, for example, to control the effect that each of the relationships has on the cost.

For example, the cost module 332 may determine the cost for a possible sequence of the target values 230-244 based on the following equation:

$$\text{Cost}=\Sigma_{i=1}^{N}\rho\epsilon^2+\|wT^*(TP_i-BTR_i)\|^2+\|wFC^*(FCP_i-\text{MinFC})\|^2+\|wPE^*(PEP_i-\text{MinPE})\|^2+\|wEE^*(EEP_i-EESP)\|^2,$$

subject to the actuator constraints 348 and the output constraints 352. Cost is the cost for the possible sequence of the target values 230-244, TPi is the predicted torque of the engine 102 for an i-th one of the N control loops, BTRi is the base torque request 308 for the i-th one of the N control loops, and wT is a weighting value associated with the relationship between the predicted torque and the base torque request.

FCPi is the predicted fuel consumption for the i-th one of the N control loops, MinFC is the predetermined minimum fuel consumption, and wFC is a weighting value associated with the relationship between the predicted fuel consumption and the predetermined minimum fuel consumption. PEPi is the predicted particle emissions for the i-th one of the N control loops, MinPE is the predetermined minimum particle emissions, and wPE is a weighting value associated with the relationship between the predicted particle emissions and the predetermined minimum particle emissions. EEPi is the predicted exhaust temperature for the i-th one of the N control loops, EESP is the exhaust temperature setpoint 342b, and wEE is a weighting value associated with the relationship between the predicted exhaust temperature and the exhaust temperature setpoint 342b.

The above equation can be expanded to:

$$\text{Cost}=\Sigma_{i=1}^{N}\rho\epsilon^2+\|wT^*(TP_i-BTR_i)\|^2+\|wFC^*(FCP_i-\text{MinFC})\|^2+\|wPE^*(PEP_i-\text{MinPE})\|^2+\|wEE^*(EEP_i-EESP)\|^2+\|wTV^*(PTTOi-TORefi)\|^2+\|wWG^*(PTWGOi-EGORefi)\|^2+\|wEGR^*(PTEGROi-EGRORefi)\|^2+\|wIP^*(PTICPi-ICPRefi)\|^2+\|wEP^*(PTECPi-ECPRefi)\|^2+\|wS^*(PSi-SRefi)\|^2+\|wN^*(PNi-NRefi)\|^2+\|wF^*(PFi-FRefi)\|^2,$$

subject to the actuator constraints 348 and the output constraints 352. PTTOi is a possible target throttle opening for the i-th one of the N control loops, TORef is the reference throttle opening for the i-th one of the N control loops, and wTV is a weighting value associated with the relationship between the possible target throttle openings and the reference throttle openings. PTWGOi is a possible target wastegate opening for the i-th one of the N control loops, WGORef is the reference wastegate opening for the i-th one of the N control loops, and wWG is a weighting value associated with the relationship between the possible target wastegate openings and the reference wastegate openings.

PTEGROi is a possible target EGR opening for the i-th one of the N control loops, EGRRef is the reference EGR opening for the i-th one of the N control loops, and wEGR is a weighting value associated with the relationship between the possible target EGR openings and the reference EGR openings. PTICi is a possible target intake cam phaser angle for the i-th one of the N control loops, ICPRef is the reference intake cam phaser angle for the i-th one of the N control loops, and wIP is a weighting value associated with the relationship between the possible target intake cam phaser angle and the reference intake cam phaser angles. PTECi is a possible target exhaust cam phaser angle for the i-th one of the N control loops, ECPRef is the reference exhaust cam phaser angle for the i-th one of the N control loops, and wEP is a weighting value associated with the relationship between the possible target exhaust cam phaser angle and the reference exhaust cam phaser angles.

PSi is a possible target spark timing for the i-th one of the N control loops, SRef is the reference spark timing for the i-th one of the N control loops, and wS is a weighting value associated with the relationship between the possible target spark timings and the reference spark timings. PM is a possible number of cylinders for the i-th one of the N control loops, NRef is the reference number of cylinders for the i-th one of the N control loops, and wN is a weighting value associated with the relationship between the possible number of cylinders and the reference number of cylinders. PFi is possible fueling for the i-th one of the N control loops, FRef is the reference fueling for the i-th one of the N control loops, and wF is a weighting value associated with the relationship between the possible fueling and the reference fueling.

$\rho$ is a weighting value associated with satisfaction of the output constraints 352. $\epsilon$ is a variable that the cost module 332 may set based on whether the output constraints 352 will be satisfied. For example, the cost module 332 may increase $\epsilon$ when a predicted parameter is greater than or less than the corresponding minimum or maximum value (e.g., by at least a predetermined amount). The cost module 332 may set $\epsilon$ to zero when all of the output constraints 352 are satisfied. $\rho$ may be greater than the weighting value wT, the weighting value wFC, the weighting value wPE, the weighting value wEE, and the other weighting values (wTV, wWG, wEGR, wIP, wEP, wS, wN, wF) such that the cost determined for a possible sequence will be large if one or more of the output constraints 352 are not satisfied. This may prevent selection of a possible sequence where one or more of the output constraints 352 are not satisfied.

The weighting value wT may be greater than the weighting value wFC, the weighting value wPE, the weighting value wEE, and the weighting values wTV, wWG, wEGR, wIP, wEP, wS, wN, and wF. In this manner, the relationship between the relationship between the predicted engine torque and the base torque request 308 have a larger effect on the cost and, therefore, the selection of one of the possible sequences as discussed further below. The cost increases as the difference between the predicted engine torque and the base torque request 308 increases and vice versa.

The weighting value wFC, the weighting value wPE, and the weighting value wEE may be greater than the weighting values wTV, wWG, wEGR, wIP, wEP, wS, wN, and wF. In this manner, the relationship between the predicted fuel consumption and the predetermined minimum fuel consumption, the relationship between the predicted particle emissions and the predetermined minimum particle emissions, and the relationship between the predicted exhaust temperature and the exhaust temperature setpoint 342b have larger effects on the cost. As the selection module 344 may select the one of the possible sequences having the lowest cost, the selection module 344 may select the one of the possible sequences that best achieves the base torque request 308 and the exhaust temperature setpoint 342b while minimizing the fuel consumption and the particle emissions.

The weighting values wTV, wWG, wEGR, wIP, wEP, wS, wN, and wF may be less than all of the other weighting values. In this manner, during steady-state operation, the target values 230-244 may settle near or at the reference values 356. During the catalyst light-off period, however, the MPC module 312 may adjust the target values 230-244 away from the reference values 356 in order to more closely track the base torque request 308, minimize the fuel consumption, minimize the particle emissions, and maximize the exhaust temperature while satisfying the actuator constraints 348 and the output constraints 352.

Figure 5:
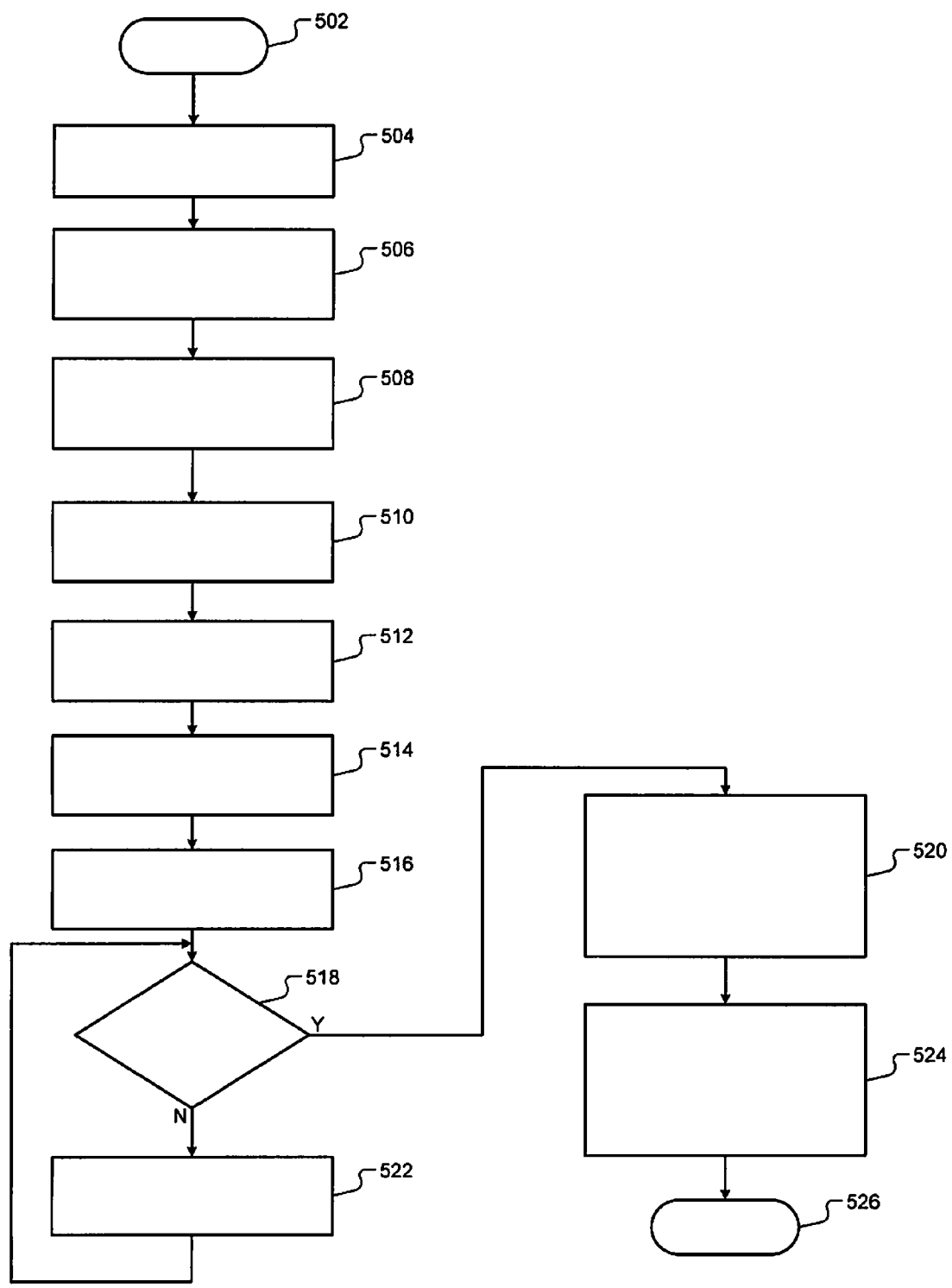
FIG. 5 is a flowchart depicting an example method of controlling a throttle valve, intake and exhaust valve phasing, a wastegate, an exhaust gas recirculation (EGR) valve, spark timing, and fueling using model predictive control according to the present disclosure.

Referring now to FIG. 5, an example method of controlling the throttle valve 112, the intake cam phaser 148, the exhaust cam phaser 150, the wastegate 162 (and therefore the turbocharger), the EGR valve 170, spark timing, fueling, and number of cylinders activated/deactivated using MPC (model predictive control) begins at 502. At 504, the propulsion torque arbitration module 214 determines the propulsion torque request 222.

At 506, the torque conversion module 304 converts the propulsion torque request 222 into the base torque request 308 or into another suitable type of torque for use by the MPC module 312. At 508, the setpoint module 370 determines the exhaust enthalpy setpoint 342a. Alternatively, setpoint module 370 determines the exhaust temperature setpoint 342b.

At 510, the sequence determination module 316 determines possible sequences of the target values 230-244. At 512, the prediction module 323 determines the predicted parameters for each of the possible sequences of target values. The prediction module 323 determines the predicted parameters for the possible sequences based on the model 324 of the engine 102, the exogenous inputs 328, and the feedback inputs 330. More specifically, based on a possible sequence of the target values 230-244, the exogenous inputs 328, and the feedback inputs 330, using the model 324, the prediction module 323 generates a sequence of N predicted torques of the engine 102 for the N control loops, a sequence of N predicted fuel efficiency values for the N control loops, and a sequence of N predicted NVH values for the N control loops.

At 514, the cost module 332 determines the costs for the possible sequences. For example, the cost module 332 may determine the cost for a possible sequence of the target values 230-244 based on the equation:

$$\text{Cost}=\Sigma_{i=1}^{N}\mu\epsilon^2+\|wT^*(TP_i-BTR_i)\|^2+\|wFC^*(FCP_i-\text{Min}FC)\|^2+\|wPE^*(PEP_i-\text{Min}PE)\|^2+\|wEE^*(EEP_i-EESP)\|^2,$$

subject to the actuator constraints 348 and the output constraints 352, as discussed above.

At 516, the selection module 344 selects one of the possible sequences of the target values 230-244 based on the costs of the possible sequences. For example, the selection module 344 may select the one of the possible sequences having the lowest cost. The selection module 344 may therefore select the one of the possible sequences that best achieves the base torque request 308 and the desired exhaust enthalpy while minimizing the fuel consumption and the particle emissions.

Instead of or in addition to determining possible sequences of the target values 230-244 at 510 and determining the cost of each of the sequences at 514, the MPC module 312 may identify a sequence of possible target values having the lowest cost using convex optimization techniques as discussed above.

At 518, the MPC module 312 determines whether the selected one of the possible sequences satisfies the actuator constraints 348. If the selected one of the possible sequences satisfies the actuator constraints 348, the method continues at 520. Otherwise, the method continues at 522, where the MPC module 312 selects the one of the possible sequences with the next lowest cost. The method then returns to 518. In this manner, the sequence with the lowest cost that satisfies the actuator constraints 348 is used.

At 520, the first conversion module 248 converts the target wastegate opening area 230 into the target duty cycle 250 to be applied to the wastegate 162, the second conversion module 252 converts the target throttle opening area 232 into the target duty cycle 254 to be applied to the throttle valve 112. The third conversion module 256 also converts the target EGR opening area 234 into the target duty cycle 258 to be applied to the EGR valve 170. The fourth conversion module may also convert the target intake and exhaust cam phaser angles 236 and 238 into the target intake and exhaust duty cycles to be applied to the intake and exhaust cam phasers 148 and 150, respectively.

At 524, the throttle actuator module 116 controls the throttle valve 112 to achieve the target throttle opening area 232, and the phaser actuator module 158 controls the intake and exhaust cam phasers 148 and 150 to achieve the target intake and exhaust cam phaser angles 236 and 238, respectively. For example, the throttle actuator module 116 may apply a signal to the throttle valve 112 at the target duty cycle 254 to achieve the target throttle opening area 232.

Also at 524, the EGR actuator module 172 controls the EGR valve 170 to achieve the target EGR opening area 234, and the boost actuator module 164 controls the wastegate 162 to achieve the target wastegate opening area 230. For example, the EGR actuator module 172 may apply a signal to the EGR valve 170 at the target duty cycle 258 to achieve the target EGR opening area 234, and the boost actuator module 164 may apply a signal to the wastegate 162 at the target duty cycle 250 to achieve the target wastegate opening area 230. Also at 524, the spark actuator module 126 controls the spark timing based on the target spark timing 240, the cylinder actuator module 120 controls cylinder activation and deactivation based on the target number of cylinders 242, and the fuel actuator module 124 controls fueling based on the target fueling parameters 244. At 526, the method may end. Alternatively, FIG. 5 may illustrate one control loop, and control loops may be executed at a predetermined rate.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A system comprising:
    a catalyst light-off circuit configured to selectively generate a first signal based on an engine coolant temperature and an estimated exhaust enthalpy;
    a setpoint circuit configured to selectively initiate a catalyst light-off period in response to receiving the first signal and that generates a desired exhaust enthalpy;
    a first model predictive control (MPC) circuit configured to:
        predict an exhaust enthalpy based on a model of an engine and multiple sets of possible target values;
        generate a respective cost for each of the sets of possible target values based on differences between the predicted exhaust enthalpy and the desired exhaust enthalpy; and
        select a set of possible target values from the multiple sets of possible target values based on the respective costs; and
    an actuator circuit configured to adjust an actuator of the engine based on at least one of the target values from the selected set of possible target values.

2. The system of claim 1 wherein the cost increases as the difference between the desired exhaust enthalpy and the predicted exhaust enthalpy increases.

3. The system of claim 2 wherein the first MPC circuit is configured to select the one of the sets of possible target values that has the lowest cost.

4. The system of claim 1 wherein the setpoint circuit is configured to generate the desired exhaust enthalpy based on at least one of a temperature of a catalyst in an exhaust system of the engine, a concentration of oxygen in the catalyst, and a concentration of emissions in the exhaust system downstream from the catalyst.

5. The system of claim 4 wherein the setpoint circuit is configured to adjust the desired exhaust enthalpy to minimize a catalyst light-off period that begins when the engine is started and ends when the catalyst temperature is equal to a light-off temperature.

6. The system of claim 5 wherein the setpoint circuit is configured to adjust the desired exhaust enthalpy to minimize an amount of emissions in exhaust gas produced by the engine during the catalyst light-off period.

7. The system of claim 1 further comprising an exhaust enthalpy circuit configured to estimate a present exhaust enthalpy based on a mass flow rate of exhaust gas produced by the engine, a temperature of the exhaust gas, and a chemical composition of the exhaust gas, wherein the first MPC circuit is configured to generate the predicted exhaust enthalpy based on the present exhaust enthalpy.

8. A method comprising:
selectively generating a first signal based on an engine coolant temperature and an estimated exhaust enthalpy;
selectively initiating a catalyst light-off period in response to receiving the first signal;
selectively generating a desired exhaust enthalpy;
generating multiple sets of possible target values;
predicting an exhaust enthalpy based on a model of an engine and the multiple sets of possible target values;
generating a respective cost for each of the sets of possible target values based on differences between the predicted exhaust enthalpy and the desired exhaust enthalpy; and
selecting a set of possible target values from the multiple sets of possible target values based on the respective costs; and
adjusting an actuator of the engine based on at least one of the target values from the selected set of possible target values.

9. The method of claim 8 further comprising the cost increases as the difference between the desired exhaust enthalpy and the predicted exhaust enthalpy increases.

10. The method of claim 9 further comprising selecting the one of the sets of possible target values that has the lowest cost.

11. The method of claim 8 further comprising generating the desired exhaust enthalpy based on at least one of a temperature of a catalyst in an exhaust system of the engine, a concentration of oxygen in the catalyst, and a concentration of emissions in an exhaust system downstream from the catalyst.

12. The method of claim 11 further comprising adjusting the desired exhaust enthalpy to minimize a catalyst light-off period that begins when the engine is started and ends when the catalyst temperature is equal to a light-off temperature.

13. The method of claim 12 further comprising adjusting the desired exhaust enthalpy to minimize an amount of emissions in exhaust gas produced by the engine during the catalyst light-off period.

14. The method of claim 8 further comprising: estimating a present exhaust enthalpy based on a mass flow rate of exhaust gas produced by the engine, a temperature of the exhaust gas, and a chemical composition of the exhaust gas; and
generating the predicted parameters based on the present exhaust enthalpy.

* * * * *